United States Patent
Morimoto et al.

(10) Patent No.: US 8,952,621 B2
(45) Date of Patent: Feb. 10, 2015

(54) HIGH PRESSURE DISCHARGE LAMP LIGHTING DEVICE, PROJECTOR PROVIDED WITH THE SAME, AND HIGH PRESSURE DISCHARGE LAMP LIGHTING METHOD

(71) Applicant: Panasonic Corporation, Osaka (JP)

(72) Inventors: Hiroji Morimoto, Nara (JP); Syunsuke Ono, Osaka (JP); Minoru Ozasa, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 51 days.

(21) Appl. No.: 13/990,079

(22) PCT Filed: Oct. 19, 2012

(86) PCT No.: PCT/JP2012/006722
§ 371 (c)(1),
(2) Date: May 29, 2013

(87) PCT Pub. No.: WO2013/114487
PCT Pub. Date: Aug. 8, 2013

(65) Prior Publication Data
US 2014/0111109 A1 Apr. 24, 2014

(30) Foreign Application Priority Data

Jan. 31, 2012 (JP) ................................ 2012-018431

(51) Int. Cl.
*H05B 37/02* (2006.01)
*H05B 39/02* (2006.01)
(Continued)

(52) U.S. Cl.
CPC ............ *H05B 41/24* (2013.01); *H05B 41/2883* (2013.01); *H05B 41/2928* (2013.01);
(Continued)

(58) Field of Classification Search
CPC ... H05B 41/28; H05B 41/295; H05B 41/2827
USPC .............................. 315/209 R, 172, 225, 226
See application file for complete search history.

(56) References Cited

U.S. PATENT DOCUMENTS 7,508,882 B2 * 3/2009 Adamiecki et al. ........... 375/291
8,115,405 B2 * 2/2012 Yamahara et al. ............ 315/276
(Continued)

FOREIGN PATENT DOCUMENTS

JP 2005-038815 A 2/2005
JP 3738712 B 11/2005
(Continued)

OTHER PUBLICATIONS

International Search Report for corresponding International Application No. PCT/JP2012/006722 mailed Jan. 15, 2013.
(Continued)

*Primary Examiner* — Alexander H Taningco
*Assistant Examiner* — Dylan White
(74) *Attorney, Agent, or Firm* — Renner, Otto, Boisselle & Sklar, LLP

(57) ABSTRACT

A calculation processing sub-unit controls a frequency control sub-unit and a DC-AC inverter circuit to repeat a first period and a second period. The first period continues for at least two cycles, each cycle including a first sub-period during which the current is maintained in one polarity and a second sub-period during which the current is maintained in an opposite polarity. The second sub-period is shorter than and subsequent to the first sub-period. The second period, during which the current is maintained in a constant polarity, is as long as or longer than the first sub-period. The calculation processing sub-unit controls a PWM control sub-unit and a voltage step-down circuit to maintain an absolute value of the current at a first current value during at least part of the first period, and at a second current value, greater than the first current value, during the second period.

12 Claims, 22 Drawing Sheets

(51) Int. Cl.
*H05B 39/04* (2006.01)
*H05B 41/36* (2006.01)
*H05B 41/24* (2006.01)
*H05B 41/288* (2006.01)
*H05B 41/292* (2006.01)
*H01J 61/12* (2006.01)
*H01J 61/86* (2006.01)
*G03B 21/20* (2006.01)

(52) U.S. Cl.
CPC ............... *H01J61/125* (2013.01); *H01J 61/86* (2013.01); *G03B 21/2026* (2013.01); *G03B 21/206* (2013.01); *Y02B 20/204* (2013.01)
USPC ...................................... 315/209 R; 363/106

(56) References Cited

U.S. PATENT DOCUMENTS

| | | | | |
|---|---|---|---|---|
| 8,207,690 | B2* | 6/2012 | Kamoi et al. | 315/308 |
| 8,284,296 | B2* | 10/2012 | Chou et al. | 348/353 |
| 8,525,431 | B2* | 9/2013 | Yamada et al. | 315/287 |
| 8,581,510 | B2* | 11/2013 | Nakada et al. | 315/291 |
| 2007/0164687 | A1* | 7/2007 | Watanabe et al. | 315/291 |
| 2009/0091272 | A1* | 4/2009 | Yamada et al. | 315/307 |
| 2010/0157257 | A1* | 6/2010 | Nishizawa et al. | 353/85 |
| 2011/0128508 | A1* | 6/2011 | Yamada et al. | 353/85 |
| 2011/0210680 | A1* | 9/2011 | Yamamoto et al. | 315/209 R |
| 2013/0038843 | A1* | 2/2013 | Yamazaki et al. | 353/85 |

FOREIGN PATENT DOCUMENTS

| | | |
|---|---|---|
| JP | 2006-156414 A | 6/2006 |
| JP | 2008-034187 A | 2/2008 |
| JP | 2008-300309 A | 12/2008 |
| JP | 2009-026747 A | 2/2009 |

OTHER PUBLICATIONS

Form PCT/ISA/237 for corresponding International Application No. PCT/JP2012/006722 dated Jan. 15, 2013.

* cited by examiner

FIG. 7
(a)
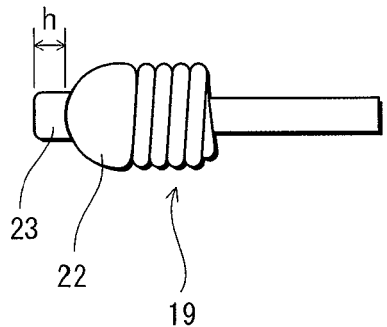
(b)
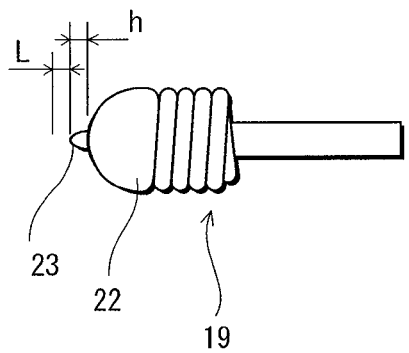
(c)
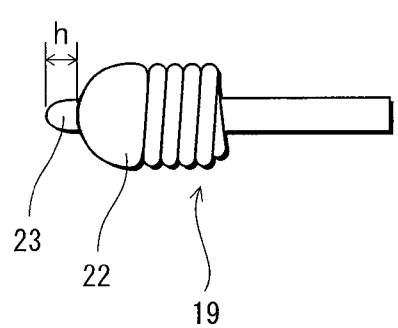
|  | Tip diameter | Tip length h |
|---|---|---|
| (a) | Excessively large | Medium |
| (b) | Excessively small | Small |
| (c) | Medium | Medium | ively low, arc jumping occurs in which the arc spot for the
HIGH PRESSURE DISCHARGE LAMP LIGHTING DEVICE, PROJECTOR PROVIDED WITH THE SAME, AND HIGH PRESSURE DISCHARGE LAMP LIGHTING METHOD

TECHNICAL FIELD

The present invention relates to a high pressure discharge lamp lighting device, a high pressure discharge lamp apparatus provided with the high pressure discharge lamp lighting device, a projector provided with the high pressure discharge lamp apparatus, and a high pressure discharge lamp lighting method. In particular the present invention relates to a high pressure discharge lamp lighting device for lighting a high pressure discharge lamp by supply of an alternating electric current.

BACKGROUND ART

Projectors are commonly used for giving presentations, such as in meetings and school classrooms, or for creating home theatre in users' homes. One example of a projector of the type described above is a projector that uses a high pressure discharge lamp as a light source. In recent years there has been demand to increase life of the high pressure discharge lamp, and also to reduce flickering that occurs when the high pressure discharge lamp is operated using eco-power, which is lower than a power rating of the high pressure discharge lamp (for example 50% to 80% of the power rating), in order to improve energy efficiency of the high pressure discharge lamp.

The high pressure discharge lamp includes an arc tube having a glass bulb with mercury and a halogen substance sealed therein, and having a pair of tungsten electrodes disposed in opposing positions to one another in the glass bulb. The high pressure discharge lamp emits light by generating an electrical discharge arc between the two electrodes. Electrons discharged by whichever of the electrodes is functioning as the cathode (referred to below as a cathode phase electrode) collide with whichever of the electrodes is functioning as the anode (referred to below as an anode phase electrode), thus causing temperature of the anode phase electrode to increase. In contrast, temperature of the cathode phase electrode decreases over time.

During lighting of the high pressure discharge lamp, tungsten evaporates from the anode phase electrode, and via a halogen cycle the tungsten deposits again on an end of the cathode phase electrode, thus forming a tip on the end of the cathode phase electrode. The above is a result of a tungsten halide compound dissociating in the halogen cycle to produce positively charged tungsten ions which are attracted towards the cathode phase electrode. The tip becomes an arc spot for the electrical discharge arc generated between the electrodes.

However, if surface temperature of the tip becomes excessively low, arc jumping occurs in which the arc spot for the electrical discharge arc on the surface of the tip changes, thus causing instability of the electrical discharge arc generated between the electrodes. If the electrical discharge arc becomes unstable as described above, flickering occurs in the high pressure discharge lamp.

In order to solve the above problem, one conventional art proposes a high pressure discharge lamp in which arc jumping on the surface of the cathode phase electrode is prevented by an absolute value of current flowing between the electrodes being increased directly prior to a polarity inversion of the current. The above causes increase in temperature of the anode phase electrode which becomes the cathode phase electrode after the polarity inversion. Therefore, surface temperature of the tip of whichever electrode becomes the cathode phase electrode after the polarity inversion is prevented from decreasing to an excessively low temperature during a period until a next polarity inversion of the current (refer to Patent Literature 1).

CITATION LIST

Patent Literature

[Patent Literature 1] Japanese Patent Publication No. 3738712

SUMMARY OF INVENTION

Technical Problem

In the high pressure discharge lamp recited in Patent Literature 1, if whichever of the electrodes is the cathode phase electrode remains in the cathode phase for a long period of time until a next polarity inversion to the anode phase, an aggregate amount of tungsten that deposits on the end of the electrode while in the cathode phase is large, causing the tip on the end of the electrode to become relatively large in diameter. Consequently, an amount of tungsten evaporating from the tip of each of the electrodes can be restricted, preventing increase in electrode separation occurring when a total amount of lighting time (referred to below as an aggregate lighting time) becomes long, and thus lengthening life of the high pressure discharge lamp. Unfortunately, if the tip becomes relatively large in diameter, surface area of the tip also increases. As a result of the increased surface area, temperature of the tip of the cathode phase electrode becomes relatively low, and thus a region in which the arc spot of the electrical discharge arc can form is enlarged. Although temperature decrease of the surface of the tip can be restricted in the above configuration, there is a possibility that as a consequence of the region in which the arc spot of the electrical discharge arc can form becoming enlarged, occurrence of arc jumping is not sufficiently prevented.

On the other hand, if whichever of the electrodes is the cathode phase electrode only remains in the cathode phase for a short period of time before the next polarity inversion to the anode phase, the aggregate amount of tungsten that deposits on the end of the electrode is small, and thus the tip on the end of the electrode becomes relatively small in diameter. As a result of the above, temperature of the tip of the cathode phase electrode becomes relatively high, and thus the region in which the arc spot of the electrical discharge arc can form is reduced in size. Although occurrence of arc jumping and therefore also flickering can be prevented in the above configuration, a disadvantageous effect is that temperature of the cathode phase electrode becomes excessively high.

As the aggregate lighting time becomes increasingly long, for each of the electrodes an aggregate amount of tungsten that evaporates from the tip and a globular portion that forms a base for the tip becomes increasingly large in comparison to an aggregate amount of tungsten that deposits on the tip and the globular portion. Over time the tip and the globular portion are gradually depleted causing the electrode separation to increase. As a result of the above, lengthening life of the high pressure discharge lamp is complicated due to enlargement over time of a discharge region in the high pressure discharge lamp.

The present invention has been achieved in view of the above problems, and an aim thereof is to provide a high pressure discharge lamp lighting device that prevents both occurrence of flickering and increase in electrode separation in a high pressure discharge lamp.

Solution to Problem

In order to achieve the above aim, a high pressure discharge lamp lighting device relating to the present invention lights, by supply of an electric current, a high pressure discharge lamp including a glass bulb with a halogen substance sealed therein and with a pair of electrodes positioned therein in opposing positions to one another, the high pressure discharge lamp lighting device comprising: a polarity inverting unit configured to invert polarity of the current to be supplied to the high pressure discharge lamp; a current modifying unit configured to modify an absolute value of the current; and a control unit configured to control the polarity inverting unit and the current modifying unit, wherein the control unit controls the polarity inverting unit to repeat a first period and a second period, the first period continuing for at least two cycles, each cycle including a first sub-period during which the current is maintained in one polarity, and a second sub-period during which the current is maintained in an opposite polarity to the one polarity, the second sub-period being shorter than and subsequent to the first sub-period, and the second period, during which the current is maintained in a constant polarity, being as long as or longer than the first sub-period, and the control unit controls the current modifying unit to maintain the absolute value of the current at a first current value during at least part of the first period, and maintain the absolute value of the current at a second current value, greater than the first current value, during the second period.

Advantageous Effects of Invention

According to the present configuration, the first period has a waveform wherein the first sub-period, during which the current is maintained in the one polarity, and the second sub-period, which is shorter than the first sub-period and during which the current is maintained in the opposite polarity, are repeated alternately. Through the above, the tip of each of the electrodes can be prevented from becoming excessively large in diameter, and thus the tip can be maintained in an appropriate shape for arc spot formation without temperature of the cathode phase electrode becoming excessively low. By maintaining the tip of each of the electrodes in an appropriate shape, occurrence of arc jumping on the surface of the tip can be prevented, and therefore the electrical discharge arc generated between the electrodes is stabilized, preventing occurrence of flickering in the high pressure discharge lamp.

Furthermore, through the above configuration, occurrence of arc jumping can be prevented while also ensuring that the first period is long enough to prevent depletion of the tip and the globular portion of each of the electrodes, thus also preventing the tip from becoming excessively small in diameter and the electrode separation from increasing.

BRIEF DESCRIPTION OF DRAWINGS

FIG. 7 is a diagram for explaining shape of a tip of each of the electrodes relating to the first embodiment.

DESCRIPTION OF EMBODIMENTS

First Embodiment (1) Configuration

Figure 1:
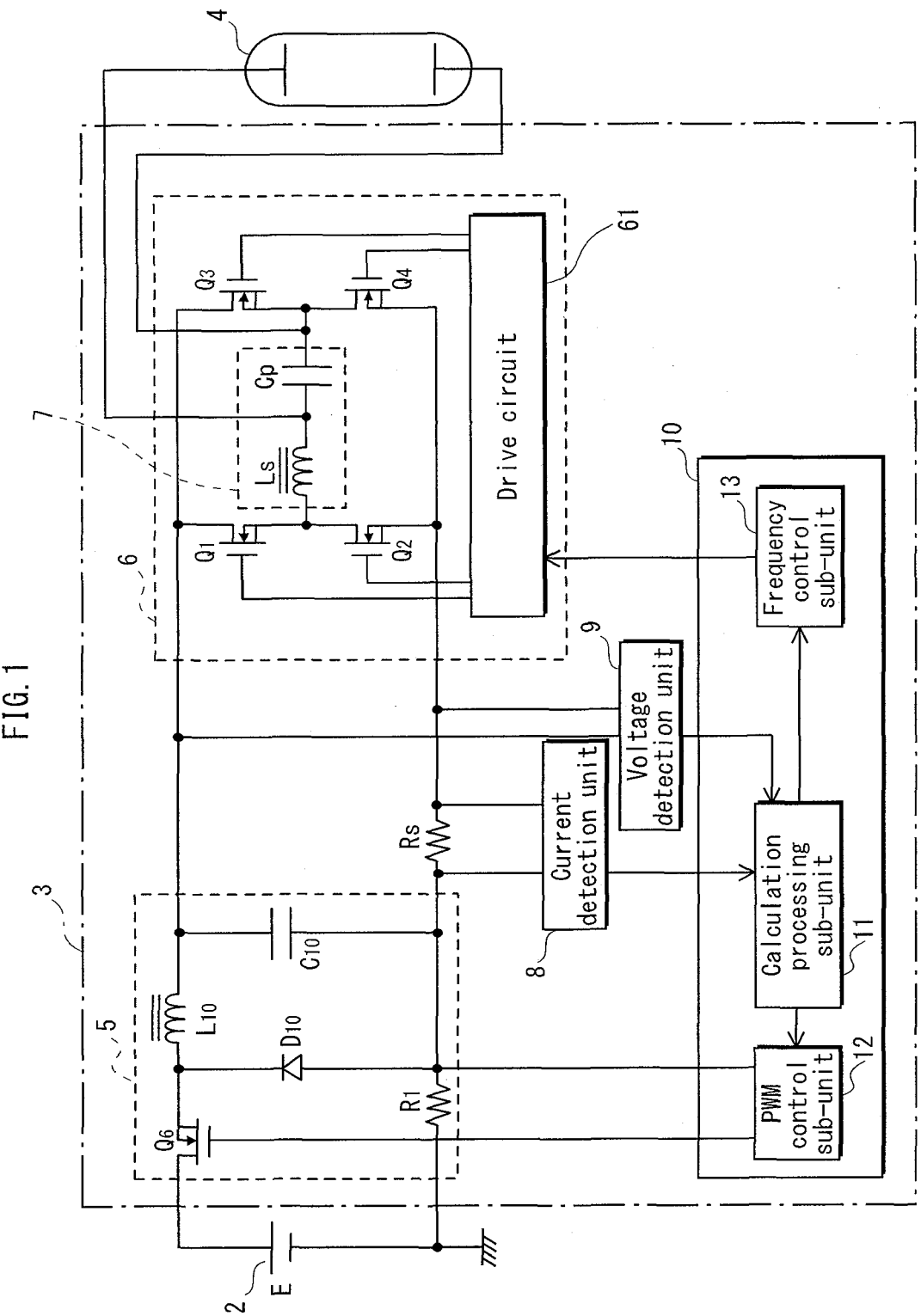
FIG. 1 is a circuit diagram of a high pressure discharge lamp apparatus relating to a first embodiment.

FIG. 1 shows a circuit diagram of a high pressure discharge lamp apparatus 1 relating to a first embodiment.

As shown in FIG. 1, the high pressure discharge lamp apparatus 1 includes a DC (Direct Current) voltage power supply device 2, a ballast (referred to below as a lamp lighting device) 3 which is connected to an output terminal of the DC voltage power supply device 2, and a high pressure discharge lamp 4 which is connected to an output terminal of the lamp lighting device 3.

The DC voltage power supply device 2 includes a rectifier circuit formed from a diode bridge. The DC voltage power supply device 2 rectifies AC (Alternating Current) voltage power (for example having an output voltage of 100 V) supplied thereto from a household source, and subsequently supplies the rectified power to the lamp lighting device 3.

The lamp lighting device 3 converts DC power supplied from the DC voltage power supply device 2 to AC power, and supplies the AC power to the high pressure discharge lamp 4.

The high pressure discharge lamp 4 is for example a high pressure mercury lamp having a power rating of 200 W. Supply of the AC power from the lamp lighting device 3 causes lighting of the high pressure discharge lamp 4.

(1.1) Lamp Lighting Device

The lamp lighting device 3 includes a voltage step-down circuit 5 for stepping-down output of the DC voltage power supply device 2, a DC-AC inverter circuit 6 which is connected to an output terminal of the voltage step-down circuit 5, a current detection unit 8, a voltage detection unit 9 and a control unit 10. The control unit 10 includes a calculation processing sub-unit 11, a PWM (Pulse Width Modulation) control sub-unit 12, and a frequency control sub-unit 13.

<Voltage Step-Down Circuit>

The voltage step-down circuit 5 is configured by a voltage step-down chopper circuit. In the voltage step-down circuit 5, a series circuit configured by a diode D10 and a resistance R1 is connected between a switching element Q6, configured by a MOSFET having a drain connected to the DC voltage power supply device 2, and an output terminal of a low voltage side of the DC voltage power supply device 2. A cathode of the diode D10 is connected to the source of the switching element Q6. A series circuit configured by an inductor L10 and a smoothing capacitor C10 is connected in parallel to the diode D10. A gate terminal of the switching element Q6 is connected to an output terminal of the PWM control sub-unit 12 which configures part of the control unit 10 and which outputs a PWM control signal. The PWM control sub-unit 12 controls magnitude of voltage between terminals of the smoothing capacitor C10 by modifying the PWM control signal input into the gate terminal of the switching element Q6. The voltage generated between the terminals of the smoothing capacitor C10 is equivalent to an output voltage of the voltage step-down circuit 5.

<DC-AC Inverter Circuit>

The DC-AC inverter circuit 6 is an inverter circuit including a full bridge circuit, and has a pair of switching element series circuits configured by four switching elements Q1-Q4 which are connected between output terminals of the voltage step-down circuit 5. Each of the switching elements Q1-Q4 may for example be configured by a MOSFET. A series circuit configured by an inductor Ls and a capacitor Cp is connected between drains of the switching elements Q2 and Q4, which are low voltage side switching elements among the four switching elements Q1-Q4. The inductor Ls and the capacitor Cp configure a resonant circuit 7 (referred to below as a high voltage generation unit). Both terminals of the capacitor Cp are connected to the high pressure discharge lamp 4. Each of the switching elements Q1-Q4 is switched on and off based on a drive signal input by a drive circuit 61.

In the above configuration, the high voltage generation unit 7 generates a high voltage between terminals of the high pressure discharge lamp 4 during start-up thereof, through the switching elements Q1 and Q2 and the switching elements Q3 and Q4 being alternately switched on and off by a resonant frequency of the inductor Ls and the capacitor Cp, due to a drive signal input into each of the switching elements Q1-Q4 from the drive circuit 61.

<Current Detection Unit>

The current detection unit 8 detects current flowing through a current detection resistance Rs which is connected in series between the voltage step-down circuit 5 and the DC-AC inverter circuit 6. The current detection unit 8 inputs a signal, indicating magnitude of the detected current, into the calculation processing sub-unit 11.

<Voltage Detection Unit>

The voltage detection unit 9 detects output voltage of the voltage step-down circuit 5. The voltage detection unit 9 inputs a signal into the calculation processing sub-unit 11 indicating magnitude of the detected voltage.

<Calculation Processing Sub-Unit>

The calculation processing sub-unit 11 includes a memory (not illustrated), an internal clock (not illustrated), and a counter (not illustrated) that calculates an amount of time passed based on a clock output by the internal clock. The memory stores therein waveform data indicating a waveform of alternating current supplied to the high pressure discharge lamp 4. The waveform data is explained in more detail further below.

Operation of the calculation processing sub-unit 11 is explained further below in section (3).

The calculation processing sub-unit 11 is equivalent to a control unit that controls a polarity inverting unit and a current modifying unit.

<PWM Control Sub-Unit>

The PWM control sub-unit 12 is able to vary the PWM control signal output therefrom, based on magnitude of a difference value notified to the PWM control sub-unit 12 by the calculation processing sub-unit 11. The PWM control sub-unit 12 causes modification of the magnitude of the DC voltage output by the voltage step-down circuit 5 so that the current value detected by the current detection unit 8 becomes equal to a current value notified by the calculation processing sub-unit 11.

For example, if a current value I1 (first current value) is set to be notified from the calculation processing sub-unit 11 to the PWM control sub-unit 12 during an A-period, an absolute value of current flowing through the high pressure discharge lamp 4 during the A-period is maintained at the current value I1. Furthermore, if a current value I2 (second current value), which is greater than the current value I1, is set to be notified from the calculation processing sub-unit 11 to the PWM control sub-unit 12 during a B-period, the absolute value of the current flowing through the high pressure discharge lamp 4 during the B-period is maintained at the current value I2.

Thus, a current modifying unit which modifies magnitude of alternating current flowing through the high pressure discharge lamp 4 is configured by the PWM control sub-unit 12 and the voltage step-down circuit 5 which modify voltage input into the DC-AC inverter circuit 6.

<Frequency Control Sub-Unit>

The frequency control sub-unit 13 sends a drive signal to the drive circuit 61 in response to frequency of a waveform selected by the calculation processing sub-unit 11. The DC-AC inverter circuit 6 performs a polarity inversion operation based on the drive signal, and is able to selectively vary a period during which the current flowing through the high pressure discharge lamp 4 is maintained in a certain polarity.

Timing of polarity inversion is determined by the internal clock in the calculation processing sub-unit 11 and the counter in the calculation processing sub-unit 11 which measures an amount of time passed based on a clock output by the internal clock.

Thus, a polarity inverting unit which inverts polarity of the current flowing through the high pressure discharge lamp 4 is configured by the frequency control sub-unit 13 and the DC-AC inverter circuit 6.

(1.2) High Pressure Discharge Lamp

An outline of configuration of the high pressure discharge lamp 4 is explained below with reference to FIG. 2.

Figure 2:
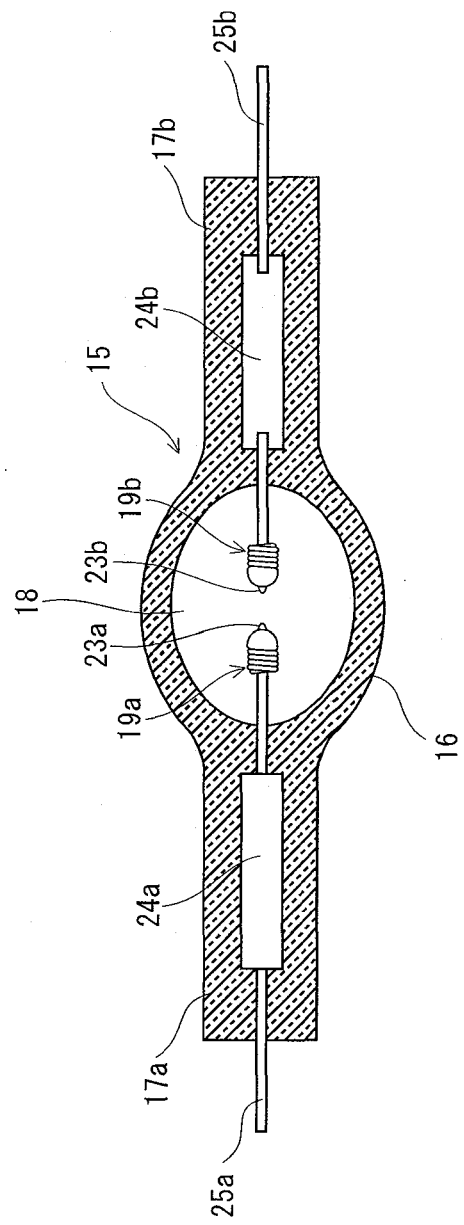
FIG. 2 is a partially cut-away lateral view of a high pressure discharge lamp relating to the first embodiment.

As shown in FIG. 2, the high pressure discharge lamp 4 includes an arc tube 15 which has a spheroidal light-emitting part 16 and sealing parts 17a, 17b provided at opposite ends of the light-emitting part 16.

The arc tube 15 may for example be formed from quartz glass. The arc tube 15 internally includes a discharge space 18. Predetermined amounts of mercury (Hg) which functions as a light-emitting material, a noble gas which facilitates start-up, and a halogen which functions in the halogen cycle, are sealed in the discharge space 18. The noble gas may for example be argon (Ar), krypton (Kr), xenon (Xe) or a mixture of two or more thereof. The halogen may be iodine (I), bromine (Br) or a mixture thereof. In one example, an amount of sealed mercury is set on a scale of 150 mg/cm$^3$ to 650 mg/cm$^3$, a pressure of sealed argon (25° C.) is set on a scale of 0.01 MPa to 1 MPa, and an amount of sealed bromine is set on a scale of $1\times10^{-10}$ mol/cm$^3$ to $1\times10^{-4}$ mol/cm$^3$, and preferably on a scale of $1\times10^{-9}$ mol/cm$^3$ to $1\times10^{-5}$ mol/cm$^3$.

A pair of electrodes 19a, 19b which are positioned approximately on the same axis and in opposing positions to one another, are provided in the discharge space 18. The electrodes 19a, 19b are formed from tungsten (W) and are electrically connected respectively to external leads 25a, 25b by metal foils 24a, 24b which are formed from molybdenum. The metal foils 24a, 24b are respectively sealed air-tightly within the sealing parts 17a, 17b.

During lighting, one of the electrodes 19a, 19b which is on a low voltage side functions as a cathode, and the other electrode 19a, 19b which is on a high voltage side functions as an anode. In the following explanation, the one electrode 19a, 19b functioning as the cathode is referred to as being in the cathode phase and the other electrode 19a, 19b functioning as the anode is referred to as being in the anode phase.

Figure 3:
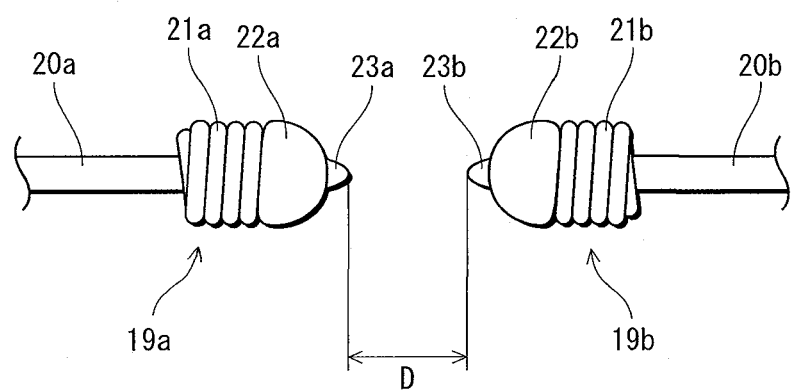
FIG. 3 is a diagram for explaining configuration of electrodes relating to the first embodiment.

As shown in FIG. 3, the electrode 19a includes an electrode rod 20a, an electrode coil 21a that is attached at one end of the electrode rod 20a, and a globular portion 22a that is approximately hemispherical and that is formed by melting a portion of the electrode rod 20a and the electrode coil 21a. A tip 23a is formed on an end of the globular portion 22a. When the electrode 19a is in the cathode phase and the electrode 19b is in the anode phase during lighting, tungsten evaporates from the electrode 19b and through the halogen cycle the tungsten is deposited on the end of the electrode 19a, thus forming the tip 23a. The electrode 19b has the same configuration as the electrode 19a, with a tip 23b formed on a globular portion 22b. The tips 23a, 23b form arc spots for an electrical discharge arc generated between the electrodes 19a, 19b. A distance between the tips 23a, 23b is defined as an electrode separation D. The electrode separation D is for example set in a range of 0.5 mm to 2.0 mm.

The globular portion 22a, 22b of each of the electrodes 19a, 19b is not limited to being hemispherical in shape, and may alternatively be approximately spherical or approximately conical. Also, the globular portion 22a, 22b of each of the electrodes 19a, 19b is not limited to being formed by melting a part of the electrode rod 20a, 20b and a part of the electrode coil 21a, 21b. Alternatively, the globular portion 22a, 22b may be shaped approximately hemispherically, spherically or conically by lathing, or be formed in one of the above shapes by sintering, and subsequently be attached to an end of the electrode rod 20a, 20b.

(2) Relationship Between Waveform of Alternating Current Output by Lamp Lighting Device and Electrode Shape The following describes a relationship between waveform of alternating current output by a lamp lighting device and electrode shape.

Figure 4:
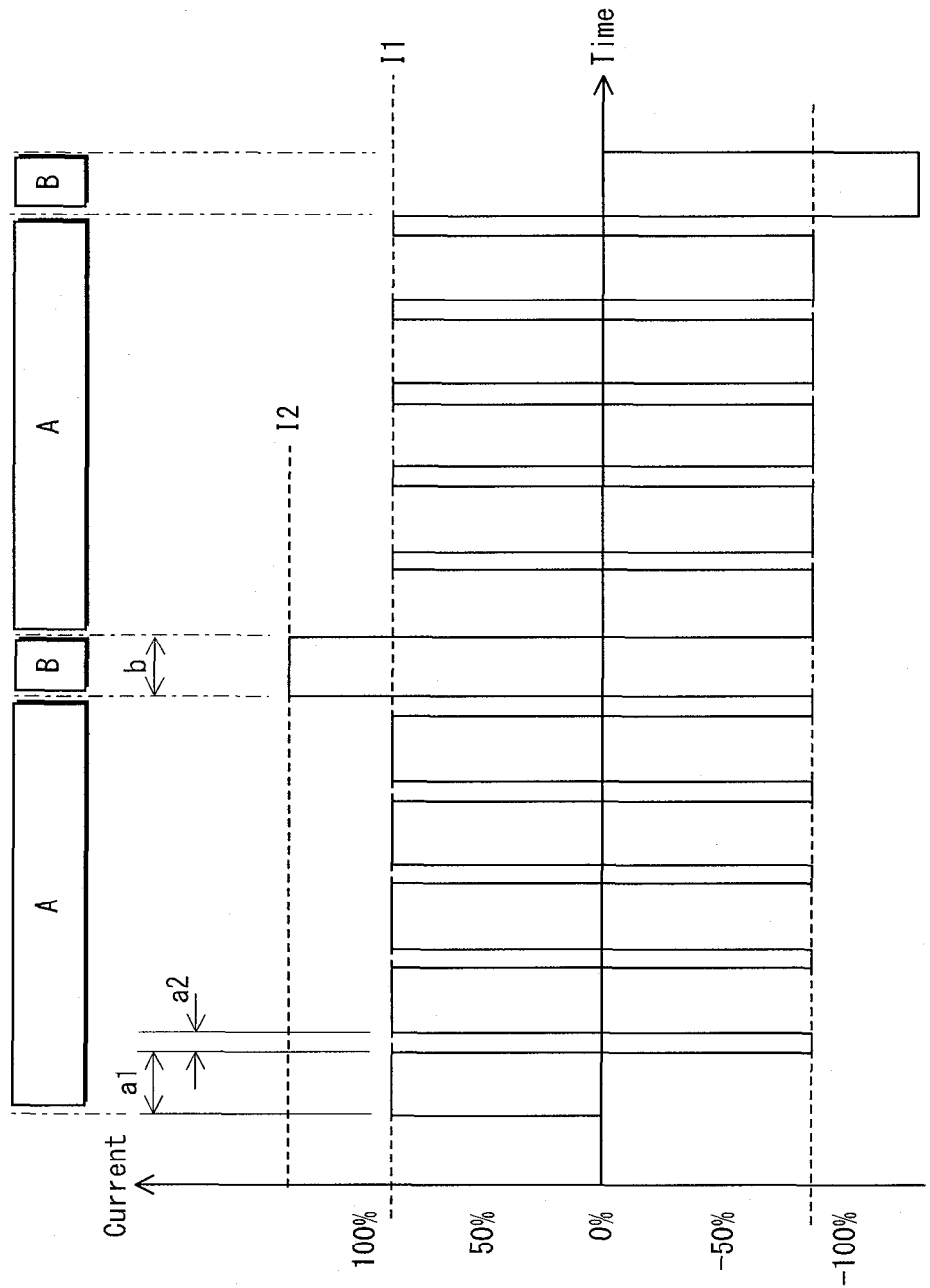
FIG. 4 is a waveform diagram of alternating current in the high pressure discharge lamp relating to the first embodiment during a stable lighting state.

FIG. 4 shows a waveform diagram of alternating current output to the high pressure discharge lamp 4 by the lamp lighting device 3 relating to the present embodiment.

As shown in FIG. 4, the A-period (first period), during which the absolute value of the alternating current is the current value I1, and the B-period (second period), during which the absolute value of the alternating current is the current value I2 which is greater the current value I1, are repeated alternately. The A-period (first period) continues for at least two cycles of the alternating current. The B-period (second period) is as long as or longer than a first sub-period (explained further below) and shorter than one cycle of the alternating current. The A-period has a waveform wherein the first sub-period (period a1), which is as long as or shorter than the B-period, and a second sub-period (period a2), which is shorter than the first sub-period (period a1), are repeated alternately. During the second sub-period (period a2), polarity of the current is inverted relative to polarity of the current during the first sub-period (period a1). In the present embodiment, the first sub-period (period a1) is set as 600 μsec, the second sub-period (period a2) is set as 200 μsec, and the B-period is set as 600 μsec. In other words, in the present embodiment the first sub-period (period a1) and the B-period are equal in length. Also, in the present embodiment the first sub-period (period a1) is three times as long as the second sub-period (period a2). In FIG. 4 the absolute value of the current is set as ±100% when equal to the current value I1. In FIG. 4 the polarity of the current is set as positive when the current is flowing from the electrode 19a to the electrode 19b in the high pressure discharge lamp 4. In other words, when the polarity of the current is positive, the electrode 19a is in the anode phase and the electrode 19b is in the cathode phase in the high pressure discharge lamp 4.

Preferably the first sub-period (period a1) should be at least three times as long as the second sub-period (period a2). For example, if the second sub-period (period a2) is 300 μsec, the first sub-period (period a1) should preferably be at least 900 μsec. Reasoning behind the above is that if the first sub-period (period a1) is at least three times as long as the second sub-period (period a2), a difference between time in the anode phase and time in the cathode phase is large, and thus diameter of the tip 23a, 23b of each of the electrodes 19a, 19b can be maintained at an appropriate size more easily.

Figure 5:
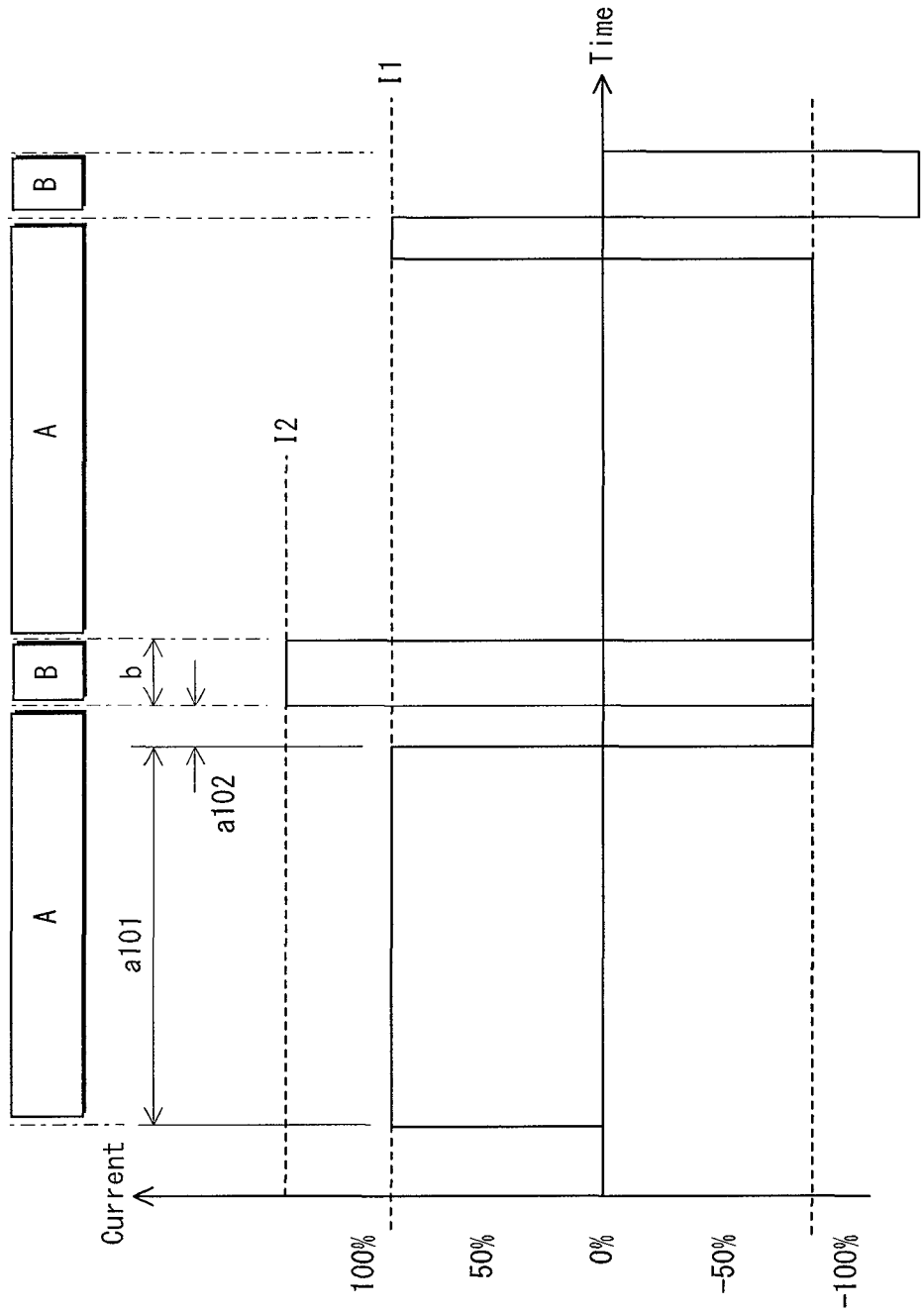
FIG. 5 is a waveform diagram showing alternating current output by a lamp lighting device relating to a comparative example.
Figure 6:
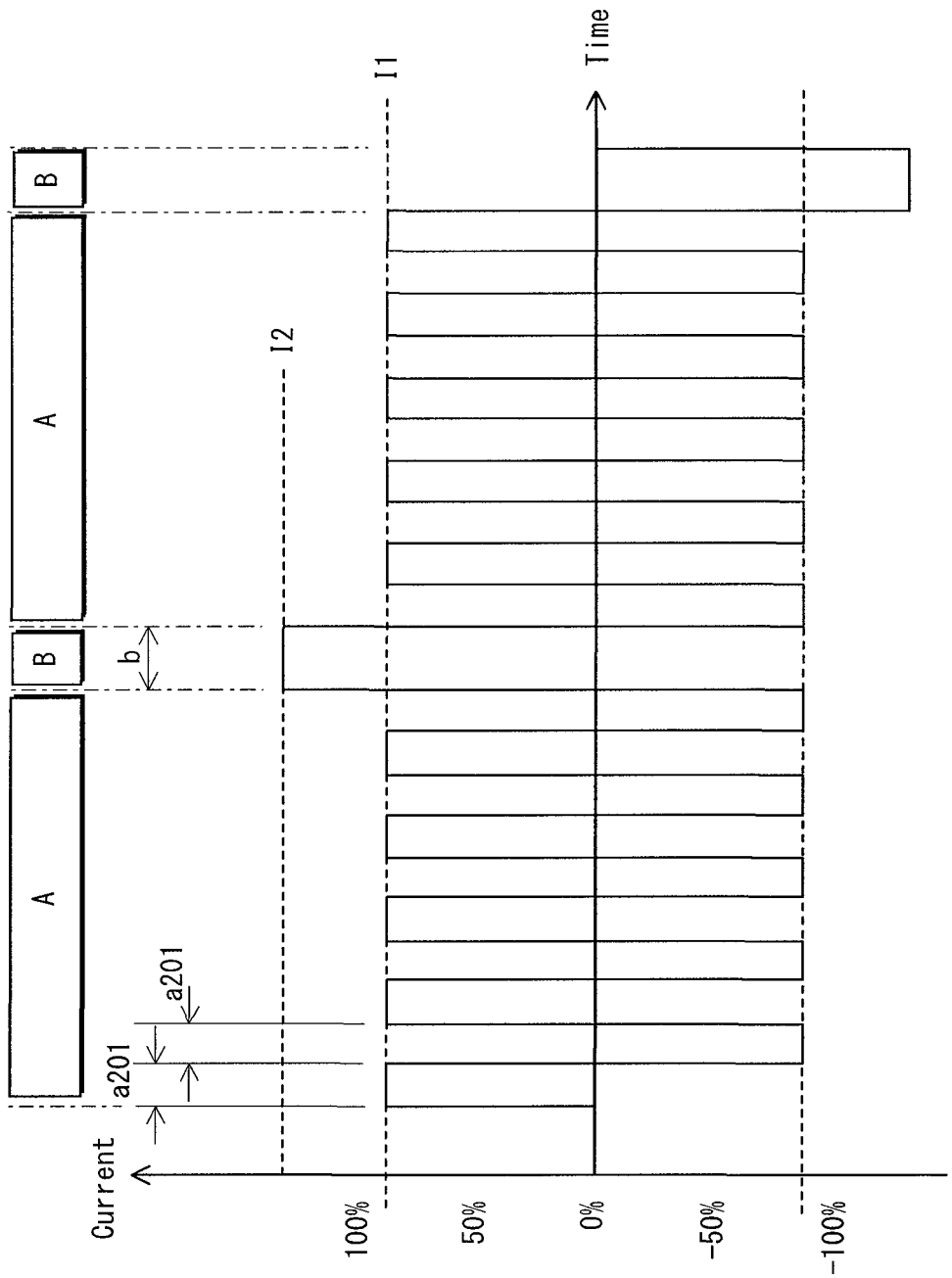
FIG. 6 is a waveform diagram showing alternating current output by a lamp lighting device relating to a comparative example.

FIG. 5 shows a waveform of alternating current output by a lamp lighting device relating to a first comparative example. FIG. 6 shows a waveform of alternating current output by a lamp lighting device relating to a second comparative example. As shown in FIGS. 5 and 6, the waveforms of alternating current output by the lighting devices relating to the first and second comparative example differ from the waveform of alternating current output by the lamp lighting device 3 relating to the present embodiment in terms of the A-period. In FIGS. 5 and 6 the absolute value of the current is set as ±100% when equal to the current value I1. Also, in FIGS. 5 and 6 the polarity of the current is set as positive when the current is flowing from the electrode 19a to the electrode 19b in the high pressure discharge lamp 4. In other words, when the polarity of the current is positive, the electrode 19a is in the anode phase and the electrode 19b is in the cathode phase in the high pressure discharge lamp 4.

As shown in FIG. 5, for the lamp lighting device relating to the first comparative example, in the A-period the polarity of the current is maintained as positive during a first sub-period (a101), and after the polarity of the current is inverted to negative, the polarity of the current is maintained as negative during a second sub-period (period a102). Subsequently, the lamp lighting device relating to the first comparative example transitions to the B-period. In a next A-period, the polarity of the current is maintained as negative during the first sub-period (period a101), and after the polarity of the current is inverted to positive, the polarity of the current is maintained as positive during the second sub-period (period a102). In the first comparative example, the first sub-period (period a101) is 3.8 msec, the second sub-period (period a102) is 200 μsec, and the B-period is 600 sec. For the first comparative example, an amount of time that passes in the A-period before the polarity of the current is inverted is long compared to the waveform of alternating current shown in FIG. 4. In other words, for the first comparative example, an amount of time that each of the electrodes 19a, 19b is maintained in either the cathode phase or the anode phase in the A-period is long compared to the waveform of alternating current shown in FIG. 4.

In contrast to the above, for the lamp lighting device relating to the second comparative example as shown in FIG. 6, a first sub-period (period a201) and a second sub-period (a202) in the A-period are equal in length. In other words, for the second comparative example each of the electrodes 19a, 19b is maintained in the cathode phase and the anode phase for equal amounts of time.

The following describes the halogen cycle. During lighting of the high pressure discharge lamp 4, electrons collide with the tip 23a, 23b of whichever of the electrodes 19a, 19b is in the anode phase, causing increase in temperature of tip 23a, 23b and thus also evaporation of tungsten therefrom. The tungsten that evaporates from whichever of the electrodes 19a, 19b is in the anode phase reacts with the halogen in the arc tube 15, and subsequently, when convection in the arc tube 15 causes the tungsten halide to flow to a region peripheral to the electrodes 19a, 19b at which temperature is high, the tungsten dissociates from the halogen to produce tungsten ions. The tungsten ions are positively charged and consequently are attracted towards the tip 23a, 23b of whichever of the electrodes 19a, 19b is in the cathode phase. The tungsten ions have a property of depositing easily as tungsten on a region which has high temperature (a region having temperature above a certain temperature, for example 1400° C.). For whichever of the electrodes 19a, 19b is in the cathode phase, the tip 23a, 23b thereof has the highest temperature, and a temperature gradient is formed wherein temperature gradually decreases with distance from the tip 23a, 23b. Consequently, for whichever of the electrodes 19a, 19b is in the cathode phase, the tungsten mainly deposits on the tip 23a, 23b and on a section of the globular portion 22a, 22b joining to the tip 23a, 23b. Furthermore, an amount of tungsten that deposits on the electrode 19a, 19b increases with increasing length of time that the electrode 19a, 19b is maintained as in the cathode phase. If the electrode 19a, 19b is maintained in the cathode phase for a sufficiently long length of time, a large amount of the tungsten ions are attracted towards the tip 23a, 23b of the electrode 19a, 19b, and deposit on the tip 23a, 23b and the section of the globular portion 22a, 22b joining to the tip 23a, 23b, thus causing the tip 23a, 23b to increase in diameter. Conversely, if the electrode 19a, 19b is maintained in the cathode phase for a short length of time, only a small amount of tungsten ions are attracted towards the tip 23a, 23b of the electrode 19a, 19b, and deposit on the tip 23a, 23b and the section of the globular portion 22a, 22b joining to the tip 23a, 23b, thus causing the tip 23a, 23b to decrease in diameter.

In the case of the lamp lighting device relating to the first comparative example shown in FIG. 5, in the A-period the electrodes 19a, 19b are each maintained in either the cathode phase or the anode phase for a long length of time. Consequently, by the time whichever of the electrodes 19a, 19b is in the cathode phase is inverted to being in the anode phase, a large amount of tungsten ions attracted towards the tip 23a, 23b while the electrode 19a, 19b was in the cathode phase have deposited on the tip 23a, 23b and the globular portion 22a, 22b.

As a result of the above, an amount of tungsten depositing on the tip 23a, 23b and the globular portion 22a, 22b exceeds an amount of tungsten evaporating from the tip 23a, 23b, and consequently the tip 23a, 23b increases in diameter (refer to diagram (a) of FIG. 7). The increase in diameter of the tip 23a, 23b causes a corresponding increase in heat capacity thereof. A disadvantageous effect of the above is that increasing temperature of whichever of the electrodes 19a, 19b is in the cathode phase is difficult even if current flowing between the electrodes 19a, 19b is increased in the B-period, and thus restricting temperature decrease of the tip 23a, 23b is complicated. Also, if the tip 23a, 23b increases in diameter, surface area of the tip 23a, 23b also increases, and therefore a region in which an arc spot can form is enlarged. Consequently, there is a possibility that occurrence of arc jumping on the surface of the tip 23a, 23b cannot be sufficiently prevented.

On the other hand, for the lamp lighting device relating to the second comparative example as shown in FIG. 6, in the A-period each of the electrodes 19a, 19b is maintained in either the cathode phase or the anode phase for a short length of time. Consequently, whichever of the electrodes 19a, 19b is in the cathode phase is inverted to being in the anode phase before a large amount of the tungsten attracted towards the tip 23a, 23b can deposit thereon. As a result of the above, an amount of tungsten evaporating from the tip 23a, 23b and the section of the globular portion 22a, 22b joining to the tip 23a, 23b, is greater than an amount of tungsten that depositing on the tip 23a, 23b and the section of the globular portion 22a, 22b joining to the tip 23a, 23b, and consequently the tip 23a, 23b decreases in diameter. As the above occurs, the tip 23a, 23b and the section of the globular portion 22a, 22b joining to the tip 23a, 23b are depleted (refer to diagram (b) of FIG. 7).

As explained above, when the lamp lighting device relating to the second comparative example is used, the tip 23a, 23b decreases in diameter, and thus thermal capacity thereof decreases by a corresponding amount. Consequently, temperature of whichever of the electrodes 19a, 19b is in the cathode phase can be reliably increased by increasing the current flowing between the electrodes 19a, 19b in the B-period. Due to the above, temperature decrease of the tip 23a, 23b can be reliably restricted, and thus occurrence of arc jumping can be sufficiently prevented. Unfortunately, a disadvantage of the above configuration is that due to depletion of the tip 23a, 23b and the section of the globular portion 22a, 22b joining to the tip 23a, 23b, the electrodes 19a, 19b retract away from one another along an extension direction thereof by a length L, therefore causing an increase in the electrode separation D of the electrodes 19a, 19b.

In contrast to the above, for the lamp lighting device 3 relating to the present embodiment as shown in FIG. 4, in the A-period the first sub-period (period a1) and the second sub-period (period a2), during which the polarity of the current is inverted relative to during the first sub-period (period a1), are repeated alternately and the first sub-period (period a1) is long compared to the second sub-period (period a2). An effect of the above is that as shown in diagram (c) of FIG. 7, compared to when the lamp lighting device relating to the first comparative example is used, increase in diameter of the tip 23a, 23b can be prevented, and thus the tip 23a, 23b can be maintained in a shape so that a region for arc spot formation remains small. Furthermore, compared to when the lamp lighting device relating to the second comparative example is used, depletion in the A-period of the tip 23a, 23b and the section of the globular portion 22a, 22b joining to the tip 23a, 23b can be prevented, and thus increase in the electrode separation D can also be prevented, allowing life of the high pressure discharge lamp to be extended.

(3) Operation

Operation of the calculation processing sub-unit 11, the PWM control sub-unit 12, and the frequency control sub-unit 13 when the lamp lighting device 3 outputs alternating current with the waveform shown in FIG. 4, is explained below with reference to the flowchart in FIG. 8.

The memory of the calculation processing sub-unit 11 stores therein as waveform data, a count value CtA corresponding to length of the A-period, a frequency f11 ($=1/(2\times a1)$), a frequency f12 ($=1/(2\times a2)$), a frequency f2 ($=1/(2\times b)$), a ratio r ($=I2/I1$)($>1$) of the current value I2 to the current value I1, and information indicating a power P (for example 60% of the power rating: 120 W) selected for supply to the high pressure discharge lamp 4. The memory also stores therein, a standard current value I10 and a frequency f10 for during a start-up lighting operation, and a standard current value I20 and a frequency f20 for during a transition to stable lighting operation. In the present embodiment the frequency f10 is greater than the frequency f20.

In the present embodiment the frequency f11 is set smaller than the frequency f12. The A-period continues for at least two cycles and at most 200 cycles, wherein one cycle is equivalent in length to the sum of the first sub-period (period a1) and the second sub-period (period a2). For example, if the periods a1 and a2 are respectively 600 μsec and 200 μsec, the frequency f11 is set as 833 Hz and the frequency f12 is set as 2.5 kHz. Also, the frequency f2 is set for example as 833 Hz when the B-period is 600 μsec. The ratio r is set as a value greater than 1 and less than or equal to 3.

When start-up lighting by the lamp lighting device 3 commences, the calculation processing sub-unit 11 performs the start-up lighting operation (Step S1).

In Step S1 the calculation processing sub-unit 11 notifies the standard current value I10 to the PWM control sub-unit 12, and the frequency f10 to the frequency control sub-unit 13. Upon notification of the frequency f10 by the calculation processing sub-unit 11, the frequency control sub-unit 13 transmits a drive signal to the drive circuit 61 in response to the frequency f10. Also, the calculation processing sub-unit 11 inputs a control scheme switching signal indicating a fixed control scheme into the PWM control sub-unit 12. Subsequently, the PWM control sub-unit 12 inputs a PWM control signal indicating a determined frequency and duty cycle into the voltage step-down circuit 5, and causing the voltage step-down circuit 5 to output a constant DC voltage. The drive circuit 61 drives the switching elements Q1-Q4 of the DC-AC inverter circuit 6 using the frequency f10 which remains constant. The high voltage generation unit 7 generates a high frequency voltage fixed for example at a voltage of 3 kV and a frequency of 100 kHz. When the high frequency voltage is applied between the electrodes 19a, 19b in the high pressure discharge lamp 4, electrical breakdown of insulation between the electrodes 19a, 19b occurs, and thus electrical discharge commences.

Once the electrical discharge commences, a predetermined period (for example two seconds) is spent in a waiting state to allow stabilization of the electrical discharge. While in the waiting state, a high frequency current continues to flow through the high pressure discharge lamp 4, the high frequency current for example having a constant maximum current value and a constant frequency which is fixed in a range of 10 kHz to 500 kHz.

After the above, the calculation processing sub-unit 11 performs the transition to stable lighting operation (Step S2). Stable lighting refers to a situation wherein the high pressure discharge lamp 4 is supplied with a constant power and gas pressure therein is in a stabilized state corresponding to the power.

In Step S2 the calculation processing sub-unit 11 calculates a difference value between the standard current value I20 and a current value detected by the current detection unit 8 (hereinafter "difference value" refers to difference between a standard current value and the current value detected by the current detection unit 8). The calculation processing sub-unit 11 notifies the difference value calculated thereby and the standard current I20 to the PWM control sub-unit 12. The calculation processing sub-unit 11 also notifies the frequency f20 to the frequency control sub-unit 13. Upon notification of the frequency f20 by the calculation processing sub-unit 11, the frequency control sub-unit 13 transmits a drive signal to the drive circuit 61 in response to the frequency f20. The PWM control sub-unit 12 modifies the PWM control signal output therefrom so that the current value detected by the current detection unit 8 is maintained equal to the standard current value I20. Subsequently, an alternating current, which for example has a constant current value and a frequency of 135 Hz, continues to flow through the high pressure discharge lamp 4 for a predetermined period. When voltage detected by the voltage detection unit 9 stabilizes, the calculation processing sub-unit 11 performs an operation to modify a PWM control signal notified to the PWM control sub-unit 12, so that a constant amount of power (for example 140 W) is supplied to the DC-AC inverter circuit 6. The above operation is continued for a period (for example 100 s) required for gas pressure in the high pressure discharge lamp 4 to reach a stabilized state. Length of the above period is set appropriately based for example on specifications of the high pressure discharge lamp 4. Once the gas pressure in the high pressure discharge lamp 4 has stabilized, the calculation processing sub-unit 11 performs an operation to modify the PWM control signal notified to the PWM control sub-unit 12, so that an average value of power supplied is maintained constant at a value close to the selected power P (for example 120 W).

Subsequently, the calculation processing sub-unit 11 performs processing to determine the current value I1 and the current value I2 of current supplied to the high pressure discharge lamp 4 (Step S3). In Step S3 the calculation processing sub-unit 11 determines the current values I1 and I2 based on a voltage value input from the voltage detection unit 9, the length of the A-period, the length of the B-period, the frequencies f11, f12 and f2, and the ratio r of the current value I2 to the current value I1.

While performing the processing in Step S3, the calculation processing sub-unit 11 simultaneously resets the counter and commences time measurement in order to make a judgment as to whether a period has passed.

Subsequently, the calculation processing sub-unit 11 notifies the frequency f11 ($=1/(2\times a1)$) to the frequency control sub-unit 13 (Step S4). More specifically, the frequency control sub-unit 13 then transmits a drive signal corresponding to the frequency f11 to the drive circuit 61. Upon transmission of the drive signal, the drive circuit 61 causes the switching elements Q1-Q4 of the DC-AC inverter circuit 6 to perform switching operations using the frequency f11.

Subsequently, the calculation processing sub-unit 11 notifies the current value I1 and the difference value to the PWM control sub-unit 12 (Step S5). Based on the current value I1 and the difference value notified by the calculation processing sub-unit 11, the PWM control sub-unit 12 modifies the PWM control signal output therefrom, thereby causing modification of magnitude of the DC voltage output by the voltage step-down circuit 5 in order that the current value detected by the current detection unit 8 becomes equal to the current value I1.

After Step S5, the calculation processing sub-unit 11 judges whether the period a1 has passed based on a measured value of the counter (Step S6).

If in Step S6 the calculation processing sub-unit 11 judges that the period a1 has not passed (Step S6: No), the calculation processing sub-unit 11 repeats processing from Step S5.

On the other hand, if in Step S6 the calculation processing sub-unit 11 judges that the period a1 has passed (Step S6: Yes), the calculation processing sub-unit 11 notifies the frequency f12 (=1/(2×a2)) to the frequency control sub-unit 13 (Step S7). More specifically, the frequency control sub-unit 13 then notifies a drive signal corresponding to the frequency f12 to the drive circuit 61. Upon notification of the drive signal, the drive circuit 61 causes the switching elements Q1-Q4 of the DC-AC inverter circuit 6 to perform switching operations using the frequency f12.

Subsequently, the calculation processing sub-unit 11 notifies the current value I1 and the difference value to the PWM control sub-unit 12 (Step S8). Based on the current value I1 and the difference value notified by the calculation processing sub-unit 11, the PWM control sub-unit 12 modifies the PWM control signal output therefrom, thereby causing modification of magnitude of the DC voltage output by the voltage step-down circuit 5 so that the current value detected by the current detection unit 8 becomes equal to the current value I1.

After Step S8, the calculation processing sub-unit 11 judges whether the period a2 has passed based on the measured value of the counter (Step S9).

If in Step S9 the calculation processing sub-unit 11 judges that the period a2 has not passed (Step S9: No), the calculation processing sub-unit 11 repeats processing from Step S8.

On the other hand, if in Step S9 the calculation processing sub-unit 11 judges that the period a2 has passed (Step S9: Yes), the calculation processing sub-unit 11 judges whether the A-period has passed (Step S10). More specifically, the calculation processing sub-unit 11 judges whether a count value of the counter has reached a count value CtA which is equivalent to length of the A-period.

If in Step S10 the calculation processing sub-unit 11 judges that the A-period has not passed (Step S10: No), the calculation processing sub-unit 11 repeats processing from Step S4.

On the other hand, if in Step S10 the calculation processing sub-unit 11 judges that the A-period has passed (Step S10: Yes), the calculation processing sub-unit 11 notifies the frequency f2 (=1/(2×b)) to the frequency control sub-unit 13 (Step S11). The frequency control sub-unit 13 notifies a drive signal, corresponding to the frequency f2 notified by the calculation processing sub-unit 11, to the drive circuit 61.

Subsequently, the calculation processing sub-unit 11 notifies the current value I2 and the difference value to the PWM control sub-unit 12 (Step S12). Based on the current value I2 and the difference value notified by the calculation processing sub-unit 11, the PWM control sub-unit 12 modifies the PWM control signal output therefrom, thereby causing modification of magnitude of the DC voltage output by the voltage step-down circuit 5 so that the current value detected by the current detection unit 8 becomes equal to the current value I2.

After Step S12, the calculation processing sub-unit 11 judges whether the B-period has passed based on the measured value of the counter (Step S13).

If in Step S13 the calculation processing sub-unit 11 judges that the B-period has not passed (Step S13: No), the calculation processing sub-unit 11 repeats processing from Step S12.

On the other hand, if in Step S13 the calculation processing sub-unit 11 judges that the B-period has passed (Step S13: Yes), the calculation processing sub-unit 11 repeats processing from Step S3. Thus, as described above each time the A-period and the B-period are repeated, processing is performed to determine the current values I1 and I2 in Step S3.

(4) Summary

In summary, for the lamp lighting device 3 relating to the present embodiment, in the A-period frequency of the alternating current is modified so that the polarity of the current is inverted only during each of the plurality of second sub-periods (period a2) which are each shorter than the B-period. Through the above, the tip 23a, 23b of each of the electrodes 19a, 19b can be prevented from becoming excessively large in diameter, and the tip 23a, 23b can be maintained in an appropriate shape so that a region for arc spot formation is small. In addition to maintaining the tip 23a, 23b in an appropriate shape, by increasing the current during the B-period temperature of the cathode phase electrode is increased, thus restricting temperature decrease of the tip 23a, 23b, and consequently preventing occurrence of arc jumping on the surface thereof. Through the above, the electrical discharge arc generated between the electrodes 19a, 19b can be stabilized, and thus occurrence of flickering in the high pressure discharge lamp 4 can be reduced.

Also, depletion of the electrodes 19a, 19b, and thus increase in the electrode separation D can be prevented in the present embodiment.

Second Embodiment

A projector relating to a second embodiment is explained below with reference to FIGS. 9-12.

Figure 9:
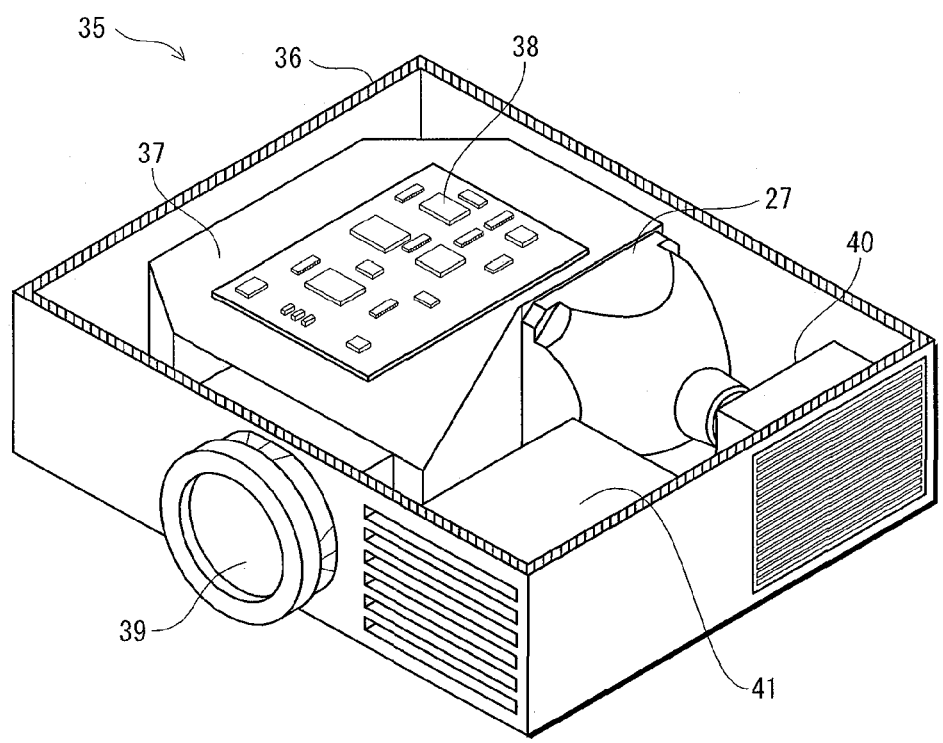
FIG. 9 is an outline perspective diagram of a front projector which is a projector relating to a second embodiment.

FIG. 9 is a perspective diagram showing an outline of configuration of a front projector 35. The front projector 35 is a projector of a type that projects an image onto a screen (not illustrated) positioned in front thereof. As a light source, the front projector 35 includes a lamp unit 27 provided with the high pressure discharge lamp 4 described in the first embodiment.

The front projector 35 further includes an optical unit 37, a control unit 38, a projection lens 39, a cooling fan unit 40, a power source unit 41, and a housing 36 which houses each of the above configuration elements. FIG. 9 shows the front projector 35 with a top plate of the housing 36 removed.

Figure 10:
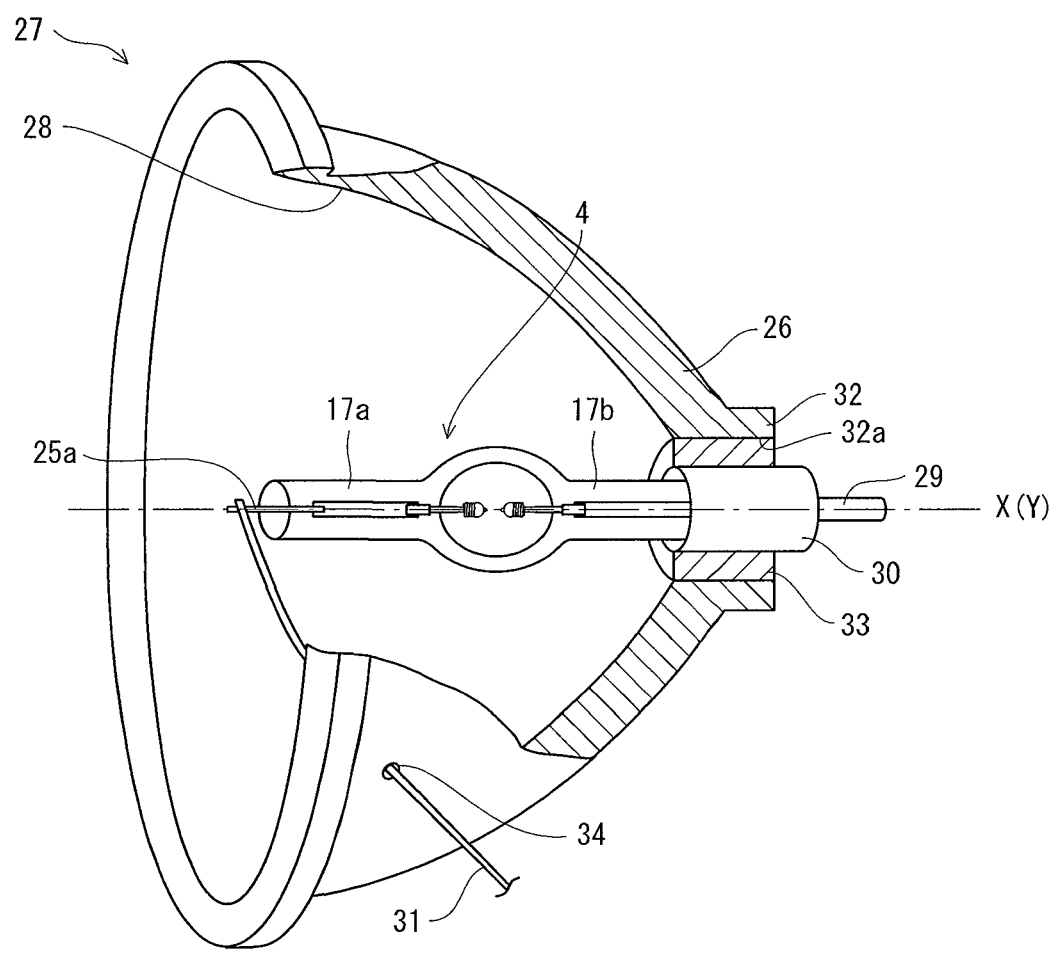
FIG. 10 is a partially cut-away perspective diagram showing a lamp unit relating to the second embodiment.

As shown in FIG. 10, the lamp unit 27 includes a reflective mirror 26 and the high pressure discharge lamp 4, which is assembled into the reflective mirror 26.

In the lamp unit 27, an inner surface of the reflective mirror 26 is configured by a reflective surface 28 which is concave. The high pressure discharge lamp 4 is assembled into the reflective mirror 26 so that a central axis X in a longitudinal direction of the high pressure discharge lamp 4 is approximately equivalent to an optical axis Y of the reflective mirror 26. Through the above configuration, light emitted by the high pressure discharge lamp 4 is reflected by the reflective surface 28, thus increasing light extraction efficiency. A body of the reflective mirror 26 is formed for example from glass or a metal. The reflective surface 28 may for example be a spheroid or paraboloid of rotation, having a multilayered interference film or the like formed thereon by vapor deposition.

The reflective mirror 26 includes a neck part 32 in which a through hole 32a is provided through a base part of the reflective surface 28. A base cap 30 which is a hollow cylinder and which has a power source connection terminal 29 attached thereto, is inserted into the through hole 32a in the neck part 32 and fixed therein by an adhesive 33. The sealing part 17b at one end of the high pressure discharge lamp 4 is attached to the base cap 30. The external lead at the end of the high pressure discharge lamp 4 closest to the sealing part 17b is connected to the power source connection terminal 29, and the external lead 25a at an end of the high pressure discharge lamp 4 closest to the sealing part 17a is connected to a power supply line 31. The power supply line 31 is inserted into a through hole 34 provided in the reflective mirror 26, and guided externally to the reflective mirror 26.

In the optical unit 37, three transmissive type liquid crystal panels are used as an image display device.

Figure 11:
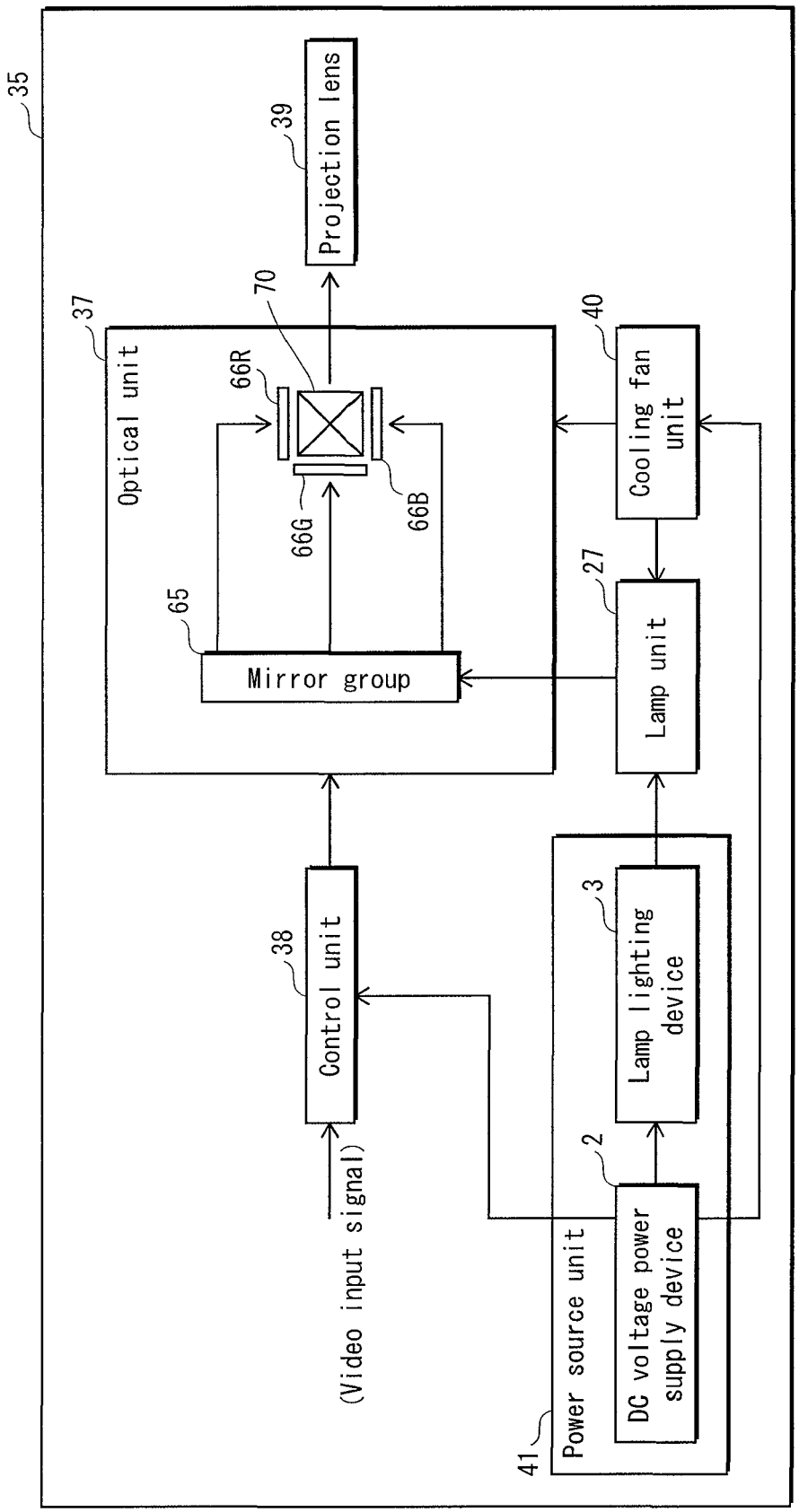
FIG. 11 is a block diagram of the front projector.

FIG. 11 is a block diagram showing configuration of the front projector 35.

As shown in FIG. 11, the optical unit 37 includes a mirror group 65 provided with a dichroic mirror, three transmissive type liquid crystal panels 66R, 66G and 66B respectively corresponding to primary colors R (Red), G (Green) and B (Blue), and a prism 70. Light emitted from the lamp unit 27 passes through the mirror group 65, wherein the light is split into light of the primary colors R, G and B. The R, G and B light respectively pass through the liquid crystal panels 66R, 66G and 66B. The liquid crystal panels 66R, 66G and 66B are driven by the control unit 38 to respectively display R, G and B color images in response to an image signal. Light of the R, G, and B color images passing through the liquid crystal panels are combined in the prism 70, and displayed on the screen through the projection lens 39.

The power source unit 41 is provided with the DC voltage power supply device 2 and the lamp lighting device 3. The power source unit 41 supplies power to configuration elements such as the control unit 38, the lamp unit 27 and the cooling fan unit 40 after converting power supplied from a commercial power source to power appropriate for the configuration element.

Through the configuration described above, the front projector 35 is provided with the lamp lighting device 3 relating to the first embodiment and an alternating current is supplied to the high pressure discharge lamp 4 in the lamp unit 27, wherein the A-period (first period) in which the absolute value of the current is the current value I1 and the B-period (second period) in which the absolute value of the current is the current value I2, which is greater than the current value I1, are repeated alternately. In the A-period, the first sub-period (period a1), which is as long as or shorter than the second period, and the second sub-period (period a2), which is shorter than the first sub-period (period a1) and during which the polarity of the current is inverted, are repeated alternately. Through the above, extended life and reduced flickering of the high pressure discharge lamp 4 can be realized, and consequently maintenance required of the projector 35 can be reduced.

Figure 12:
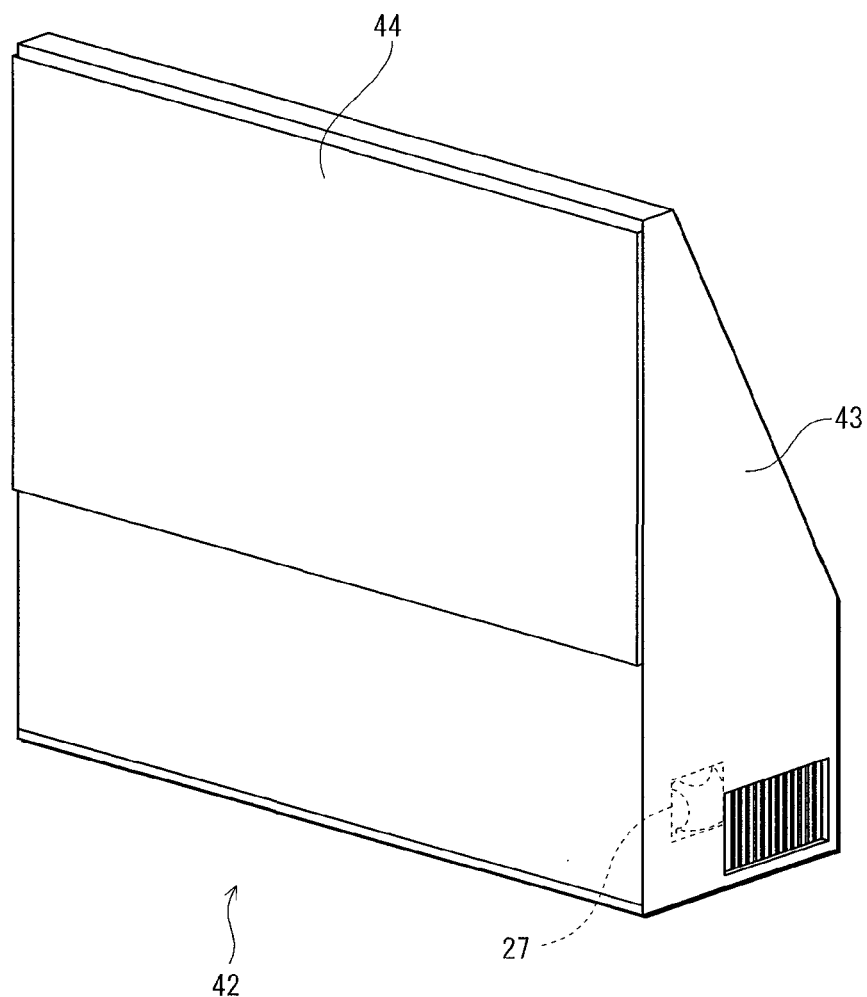
FIG. 12 is an outline perspective diagram of a rear projector.

FIG. 12 is a perspective diagram showing outline configuration of a rear projector 42.

The rear projector 42 includes a housing 43 which houses the lamp unit 27 and also houses an optical unit, a projection lens, a mirror and a high pressure discharge lamp lighting device which are not illustrated in FIG. 12. An image projected by the projection lens and reflected by the mirror, is displayed by projection onto a rear side of a transmissive type screen 44. In the rear projector 42, an alternating current is supplied to the high pressure discharge lamp 4 in the lamp unit 27, wherein the A-period (first period) in which the absolute value of the current is the current value I1, and the B-period (second period) in which the absolute value of the current is the current value I2, which is greater than the current value I1, are repeated alternately. In the A-period, the first sub-period (period a1), which is as long as or shorter than the second period, and the second sub-period (period a2), which is shorter than the first sub-period (period a1) and during which the polarity of the current is inverted, are repeated alternately. Through the above, extended life and reduced flickering of the high pressure discharge lamp 4 can be realized, and consequently maintenance required of the rear projector 42 can be reduced.

MODIFIED EXAMPLES (1) The first embodiment was explained using as an example the lamp lighting device 3 where the absolute value of the current is fixed at the current value I1 in the A-period, but the present invention is not limited by the above.

Figure 13:
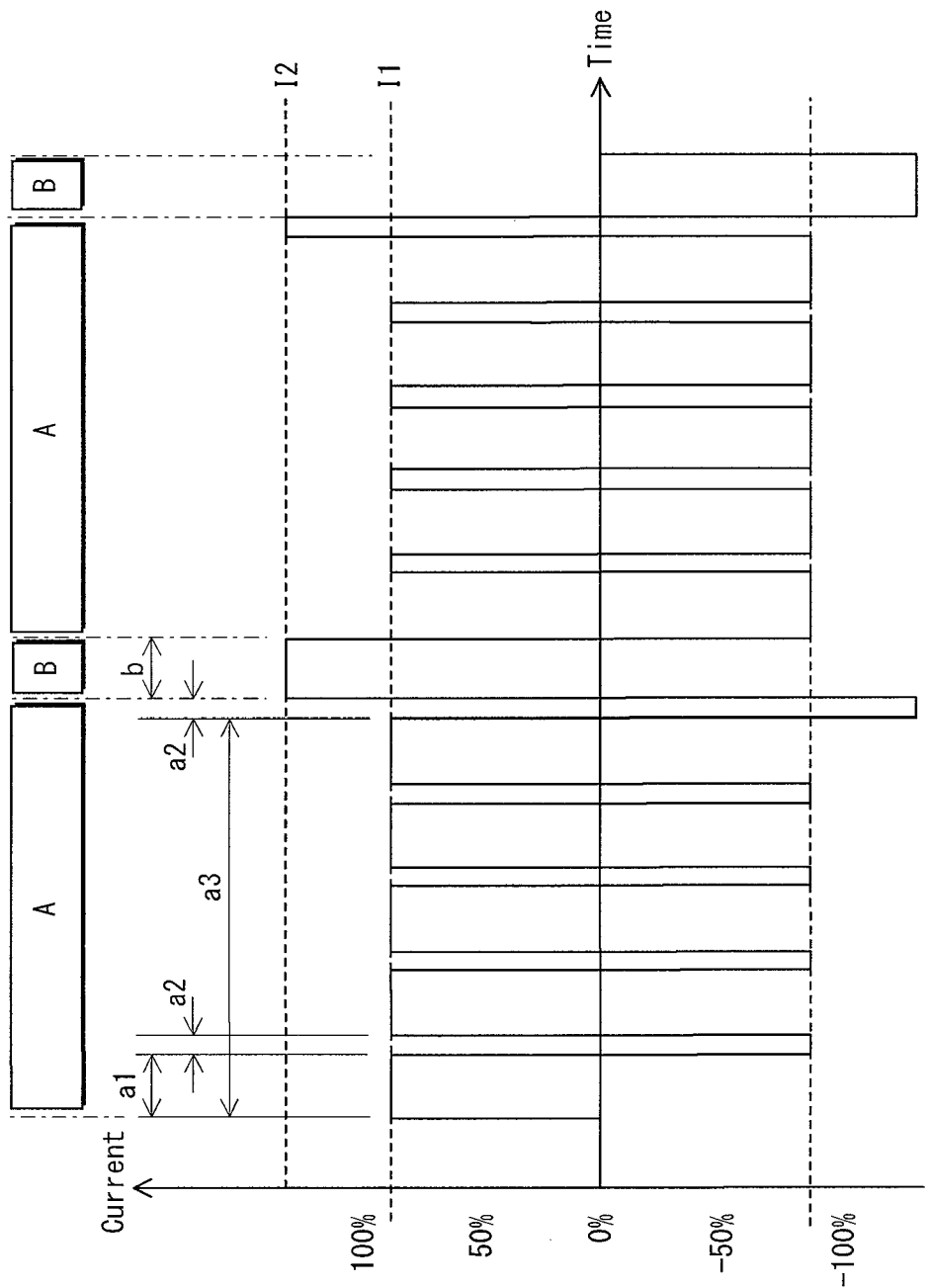
FIG. 13 is a waveform diagram showing alternating current output by a lamp lighting device relating to a modified example.

FIG. 13 is a waveform diagram showing alternating current output by a lamp lighting device relating to a modified example.

As shown in FIG. 13, alternatively in the A-period the absolute value of the current may be increased to a current value greater than the current value I1 during a second sub-period (period a2) occurring directly prior to transitioning to the B-period.

Figure 14:
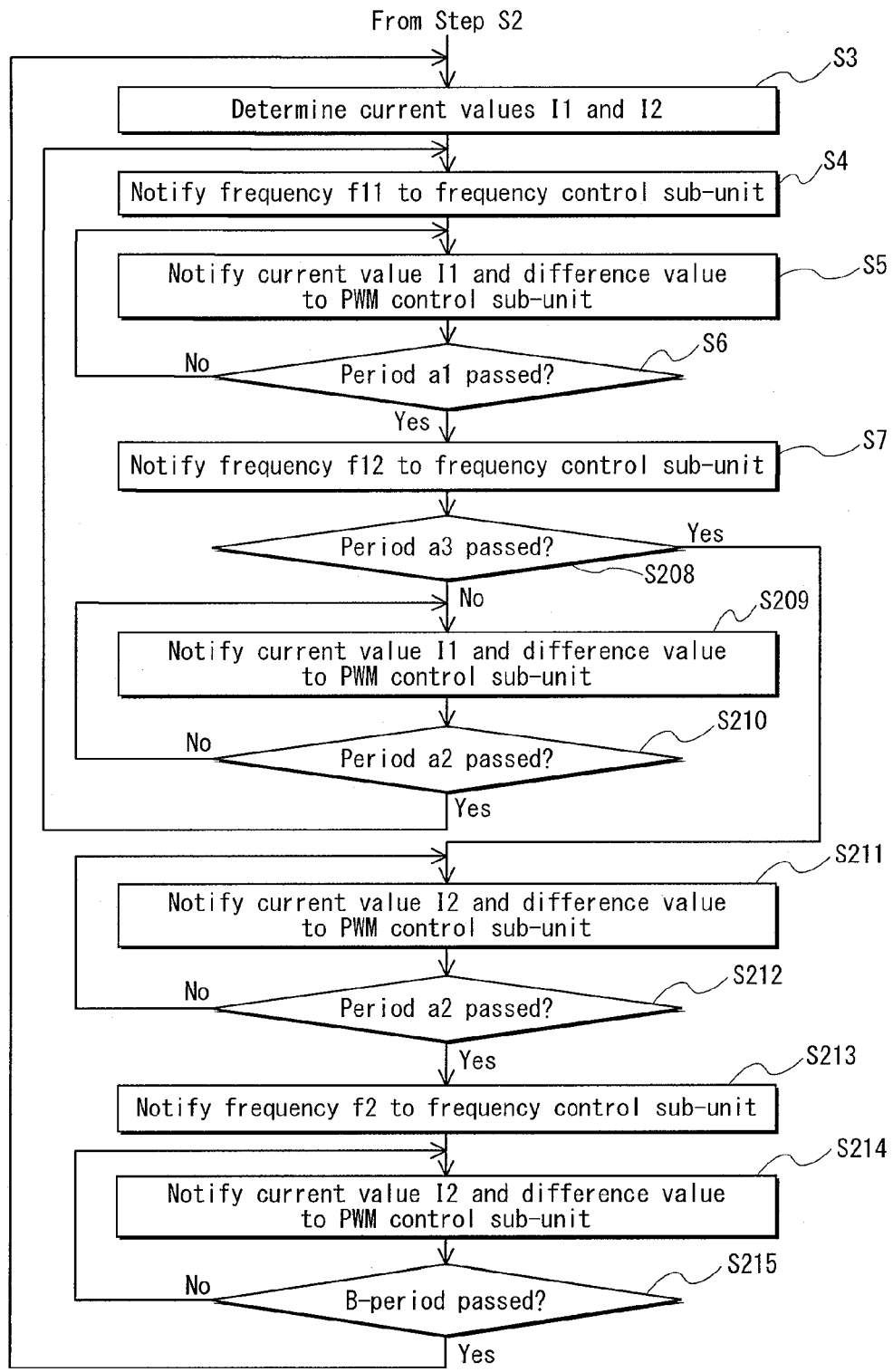
FIG. 14 is a flowchart showing operation of a calculation processing sub-unit included in a lamp lighting device relating to a modified example.

FIG. 14 shows a flowchart for operation of the calculation processing sub-unit 11 in the case of the lamp lighting device relating to the present modified example, which outputs an alternating current with the waveform shown in FIG. 13. Explanation of Steps S1-S7, which are identical to in the first embodiment, is omitted.

In the present modified example, the memory of the calculation processing sub-unit 11 stores therein as waveform data, a count value Cta3 corresponding to length of a period a3, the length of the A-period, the length of the B-period, the frequencies f11, f12 and f2, the ratio r (=I2/I1)(>1) of the current value I2 to the current value I1, and the information indicating the power P (for example 120 W) selected for supply to the high pressure discharge lamp 4. Each of the above, with the exception of the count value Cta3 corresponding to length of the period a3, is identical to in the first embodiment, and therefore explanation thereof is omitted.

After the processing in Step S7, the calculation processing sub-unit 11 judges whether the period a3 has passed (Step S208). Specifically, the calculation processing sub-unit 11 judges whether the count value of the counter has reached the count value Cta3 which corresponds to the length of the period a3.

If the calculation processing sub-unit 11 judges in Step S208 that the period a3 has passed (Step S208: Yes), the calculation processing sub-unit 11 notifies the current value I2 and the difference value to the PWM control sub-unit 12 (Step S211). Based on the current value I2 and the difference value notified by the calculation processing sub-unit 11, the PWM control sub-unit 12 modifies the PWM control signal output therefrom, thereby causing modification of magnitude of the DC voltage output by the voltage step-down circuit 5 so that the current value detected by the current detection unit 8 becomes equal to the current value I2.

After the above, the calculation processing sub-unit 11 judges whether the period a2 has passed based on the measured value of the counter (Step S212).

If in Step S212 the calculation processing sub-unit 11 judges that the period a2 has not passed (Step S212: No), the calculation processing sub-unit 11 repeats processing from Step S211.

On the other hand, if in Step S212 the calculation processing sub-unit 11 judges that the period a2 has passed (Step S212: Yes), the calculation processing sub-unit 11 proceeds to processing in Step S213. The calculation processing sub-unit 11 notifies the frequency f2 (=1/(2×b)) to the frequency control sub-unit 13.

Subsequently, the calculation processing sub-unit 11 notifies the current value I2 and the difference value to the PWM control sub-unit 12 (Step S214). Based on the current value I2 and the difference value notified by the calculation processing sub-unit 11, the PWM control sub-unit 12 modifies the PWM control signal output therefrom, thereby causing modification of magnitude of the DC voltage output by the voltage step-down circuit 5 so that the current value detected by the current detection unit 8 becomes equal to the current value I2.

After the above, the calculation processing sub-unit 11 judges whether the B-period has passed based on the measured value of the counter (Step S215).

If in Step S215 the calculation processing sub-unit 11 judges that the B-period has not passed (Step S215: No), the calculation processing sub-unit 11 repeats processing from Step S214.

On the other hand, if in Step S215 the calculation processing sub-unit 11 judges that the B-period has passed (Step S215: Yes), the calculation processing sub-unit 11 repeats processing from Step S3.

If the calculation processing sub-unit 11 judges in Step S208 that the period a3 has not passed (Step S208: No), the calculation processing sub-unit 11 notifies the current value I1 and the difference value to the PWM control sub-unit 12 (Step S209). Based on the current value I1 and the difference value notified by the calculation processing sub-unit 11, the PWM control sub-unit 12 modifies the PWM control signal output therefrom, thereby causing modification of magnitude of the DC voltage output by the voltage step-down circuit 5 so that the current value detected by the current detection unit 8 becomes equal to the current value I1.

After the above, the calculation processing sub-unit 11 judges whether the period a2 has passed based on the measured value of the counter (Step S210).

If in Step S210 the calculation processing sub-unit 11 judges that the period a2 has not passed (Step S210: No), the calculation processing sub-unit 11 repeats processing from Step S209.

On the other hand, if in Step S210 the calculation processing sub-unit 11 judges that the period a2 has passed (Step S210: Yes), the calculation processing sub-unit 11 repeats processing from Step S4.

Processing in Steps S3-S7 and Steps S208-S215 described above is repeated until a power source of the lamp lighting device is switched off.

Through the configuration in the present modified example, wherein in the A-period the absolute value of the current is increased to the current value greater than the current value I1 during the second sub-period (period a2) directly prior to transition to the B-period, efficiency of electrode heating in the B-period can be increased. As a result of the above, occurrence of arc jumping can be further prevented.

(2) The first embodiment was explained using an example wherein whichever of the electrodes 19a, 19b is mostly in the cathode phase and whichever the electrodes 19a, 19b is mostly in the anode phase is switched after each repetition of one A-period and one B-period, but the present invention is not limited by the above.

Figure 15:
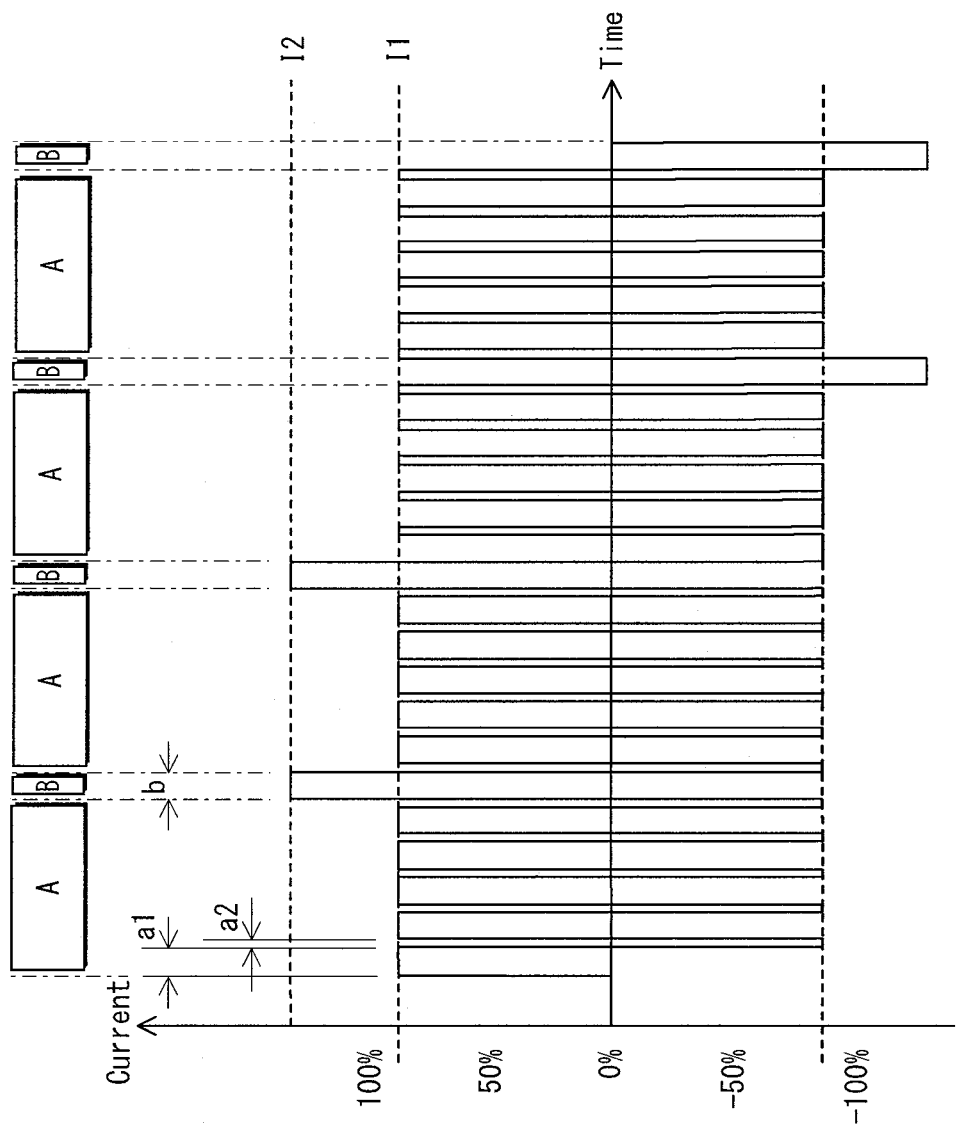
FIG. 15 is a waveform diagram showing alternating current output by a lamp lighting device relating to a modified example.
Figure 17:
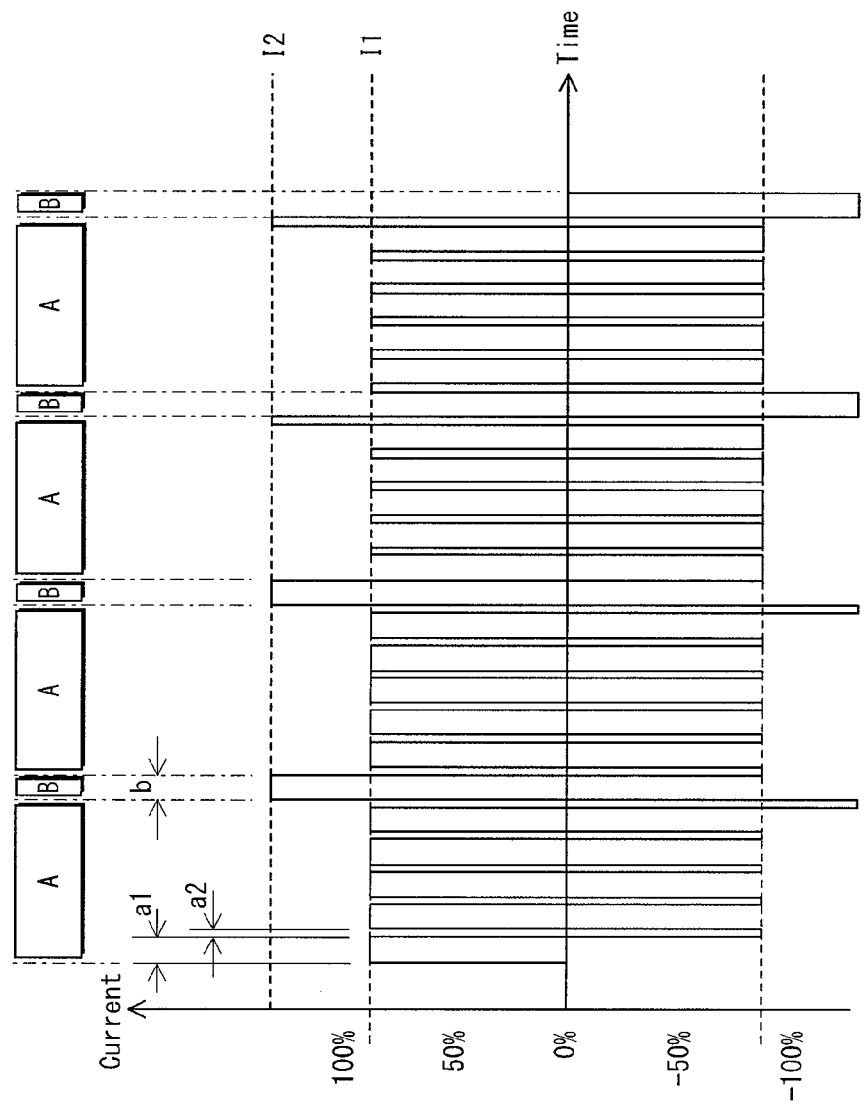
FIG. 17 is a waveform diagram showing alternating current output by a lamp lighting device relating to a modified example.

FIGS. 15 and 17 are waveform diagrams showing alternating current output by a lamp lighting device relating to a present modified example.

As shown in FIG. 15, alternatively whichever of the electrodes 19a, 19b is mostly in the cathode phase and whichever of the electrodes 19a, 19b is mostly in the anode phase may be switched after each repetition of two A-periods and two B-periods.

Figure 8:
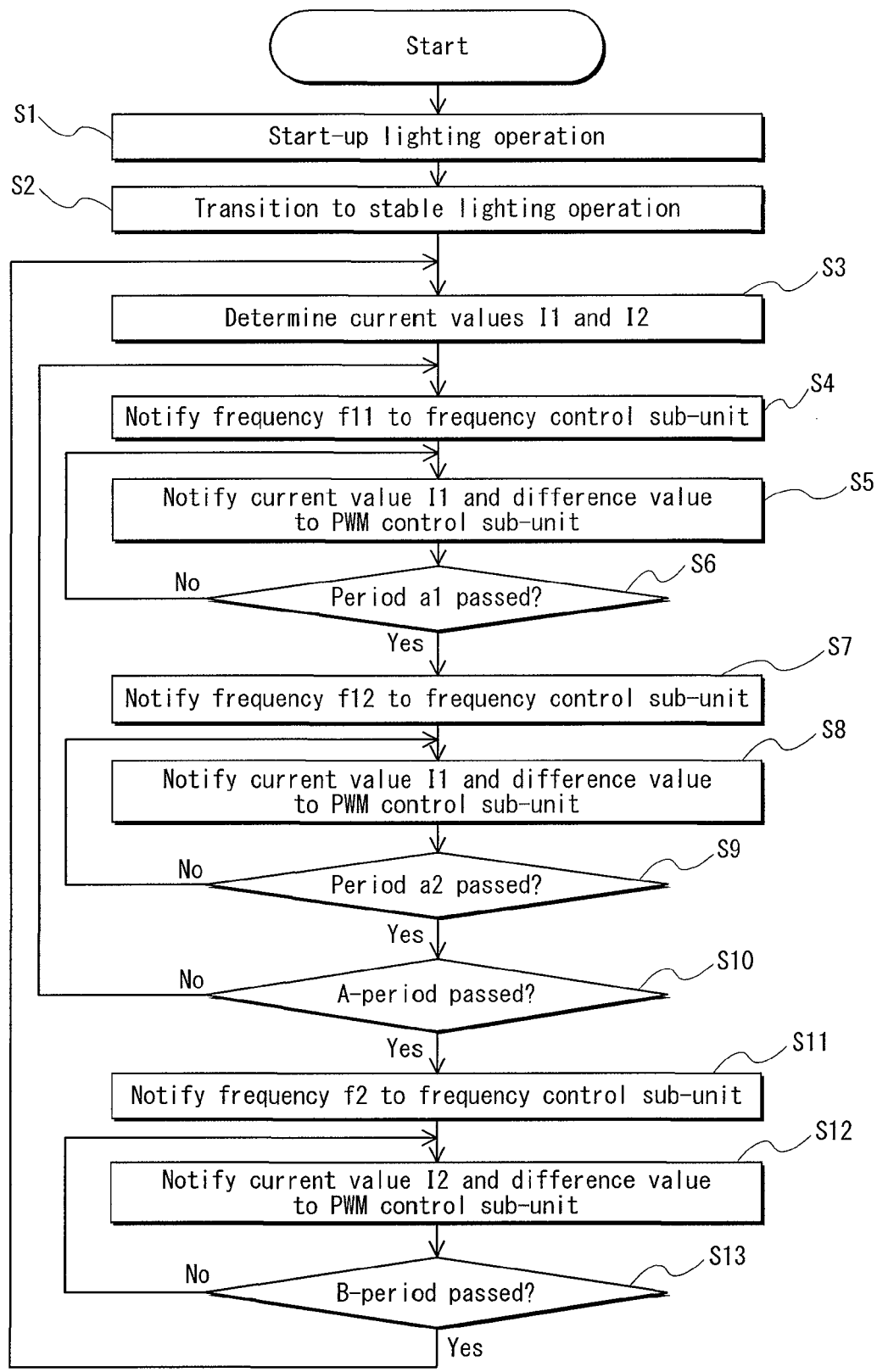
FIG. 8 is a flowchart showing operation of a calculation processing sub-unit included in a lamp lighting device relating to the first embodiment.
Figure 16:
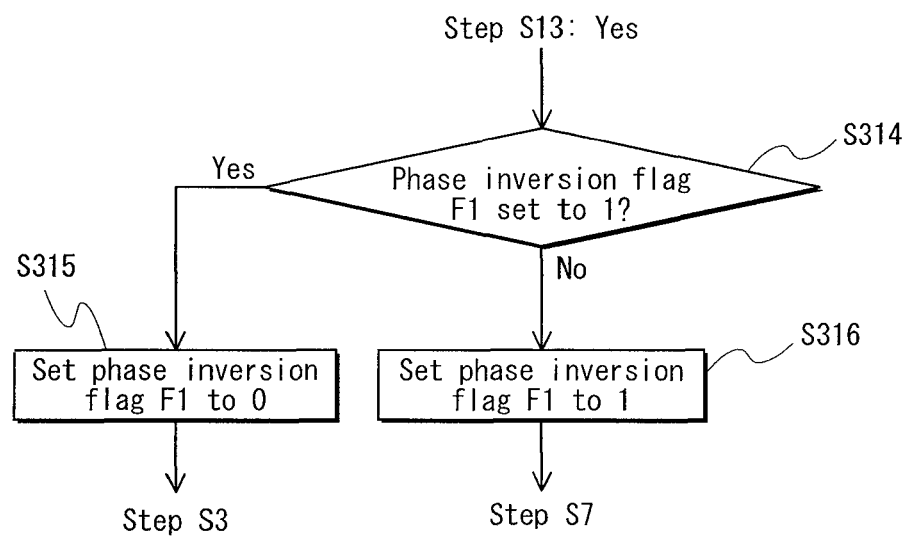
FIG. 16 is a flowchart showing operation of a calculation processing sub-unit included in a lamp lighting device relating to a modified example.

For the lamp lighting device relating to the present modified example, when outputting alternating current as shown in FIG. 15 a flowchart for operation of the calculation processing sub-unit 11 is the flowchart shown in FIG. 8 with additional steps shown in FIG. 16. Processing in Steps S1-S13 is identical to in the first embodiment, thus explanation thereof is omitted below.

In the present modified example, the memory of the calculation processing sub-unit 11 stores therein the same waveform data as in the first embodiment. The memory is further provided with a region for storing a phase inversion flag F1 which is used to control switching (phase inversion) of whichever of the electrodes 19a, 19b is mainly in the cathode phase with whichever of the electrodes 19a, 19b is mainly in the anode phase after each repetition of two A-periods and two B-periods. The phase inversion flag F1 is initially set to 0.

After processing in Step S13, the calculation processing sub-unit 11 judges whether the phase inversion flag F1 is set to 1 (Step S314).

If in Step S314 the calculation processing sub-unit 11 judges that the phase inversion flag F1 is not set to 1 (Step S314: No), the calculation processing sub-unit 11 sets the phase inversion flag F1 to 1 (Step S316), and subsequently proceeds to processing in Step S7 (refer to FIG. 8).

On the other hand, if in Step S314 the calculation processing sub-unit 11 judges that the phase inversion flag F1 is set to 1 (Step S314: Yes), the calculation processing sub-unit 11 sets the phase inversion flag F1 to 0 (Step S315), and subsequently proceeds to processing in Step S3 (refer to FIG. 8).

Processing in Steps S3-S13 and Steps S314-S316 described above is repeated until a power source of the lamp lighting device is switched off.

By changing contents of the phase inversion flag F1 for each repetition of two A-periods and two B-periods as described above, alternating current with the waveform shown in FIG. 15 can be generated.

In the present modified example, whichever of the electrodes 19a, 19b is mainly in the cathode phase and whichever of the electrodes 19a, 19b is mainly in the anode phase is switched for each repetition of two A-periods and two B-periods. If for example power supply to the high pressure discharge lamp 4 is relatively low (no greater than 60% of the power rating), temperature of whichever of the electrodes 19a, 19b is in the anode phase may not be sufficiently increased during a repetition of just one A-period and one B-period. Therefore, by continuing to heat whichever of the electrodes 19a, 19b is in the anode phase for the repetition of two A-periods and two B-periods as in the present modified example, temperature of the anode phase electrode can be increased, thus preventing occurrence of arc jumping after transition to the anode phase.

As shown in FIG. 17, alternatively for the waveform shown in FIG. 15, in the A-period the absolute value of the current may be increased to a current value greater than the current value I1 during the second sub-period (period a2) directly prior to transitioning to the B-period.

When the lamp lighting device outputs alternating current with the waveform shown in FIG. 17, in the A-period the absolute value of the current is switched to the current value higher than the current value I1 during the second sub-period (period a2) directly prior to transitioning to the B-period. Through the above, in each repetition of two A-periods and two B-periods, efficiency of electrode heating in the B-period can be improved. Furthermore, through the above, occurrence of arc jumping can be prevented even when power supply is low relative to the power rating.

(3) The first embodiment was explained using an example where the first sub-period (period a1), during which the polarity of the current is the same as in the B-period, and the second sub-period (period a2), during which the polarity of the current is opposite to in the B-period, are repeated alternately in the A-period. However, the above is not a limitation on the present invention.

Figure 18:
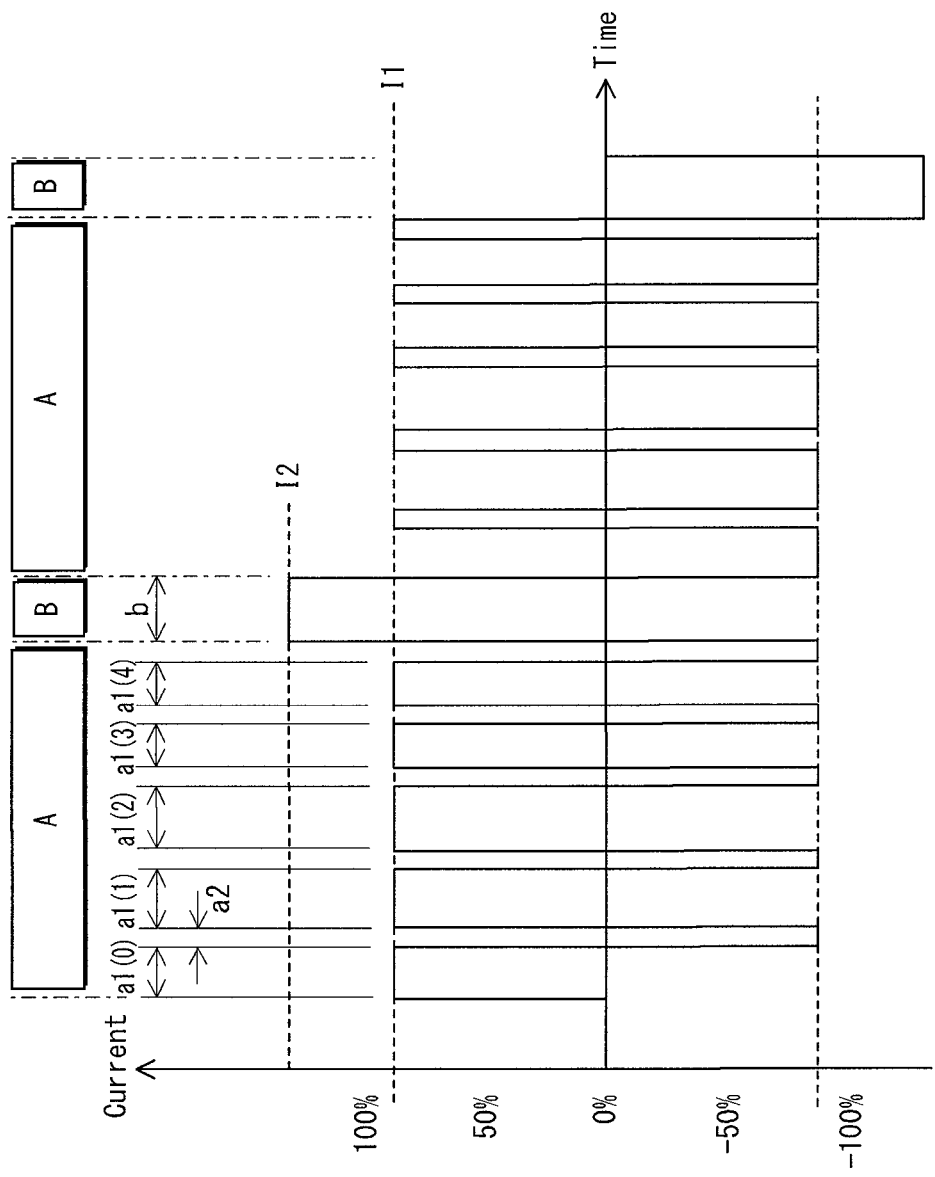
FIG. 18 is a waveform diagram showing alternating current output by a lamp lighting device relating to a modified example.
Figure 20:
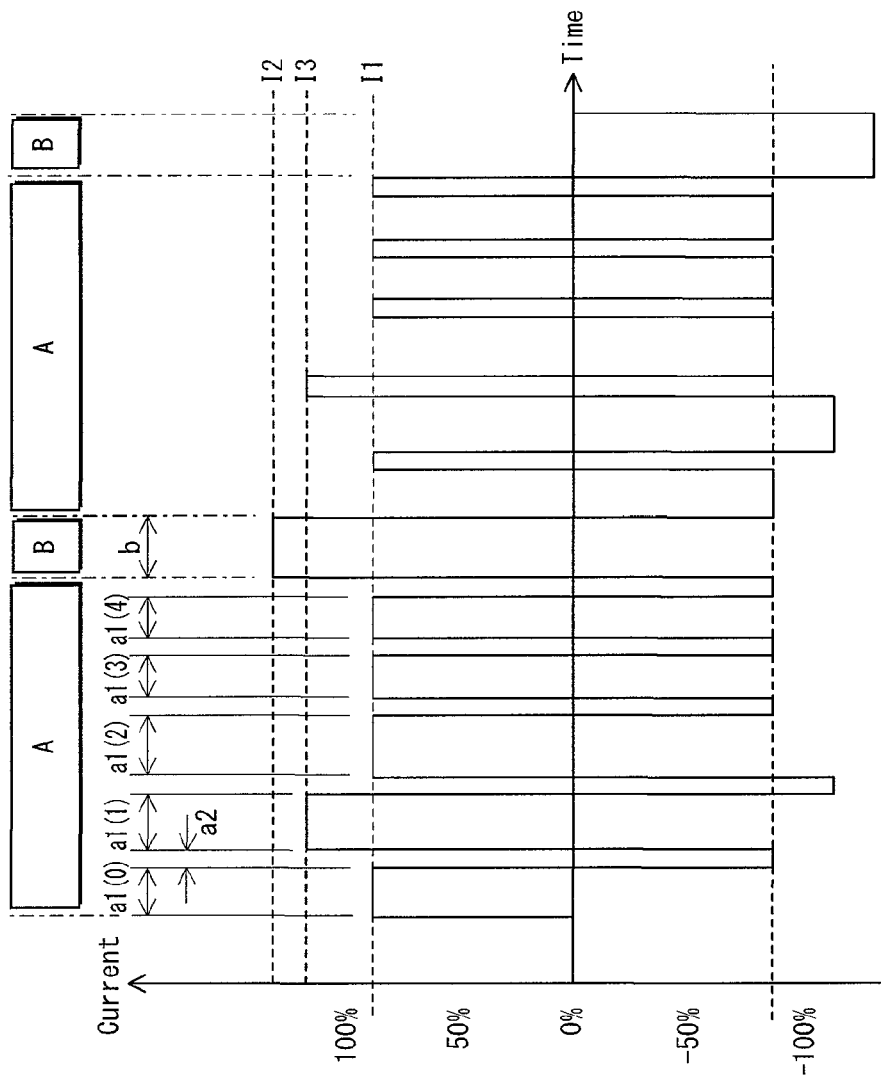
FIG. 20 is a waveform diagram showing alternating current output by a lamp lighting device relating to a modified example.

FIGS. 18 and 20 are waveform diagrams showing alternating current output by a lamp lighting device relating to a present modified example.

As shown in FIG. 18, alternatively in the A-period a plurality of first sub-periods (periods a1(0), a1(1), a1(2), a1(3), and a1(4)), each being between two second sub-periods (periods a2) on the time axis, may each differ from one another. In other words, the first sub-periods in the A-period during each of which the polarity of the current is the same, each differ from one another in terms of length.

Figure 19:
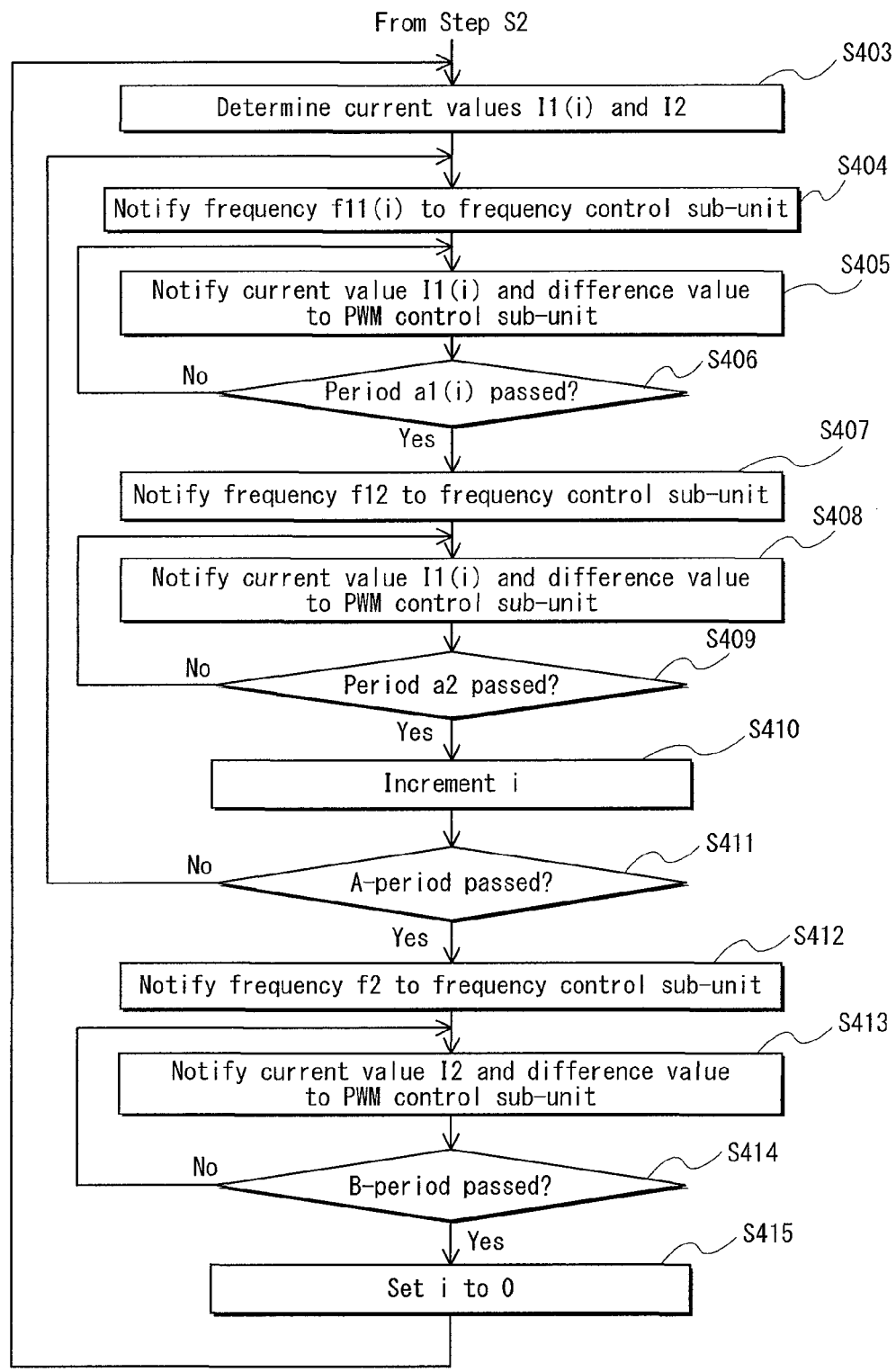
FIG. 19 is a flowchart showing operation of a calculation processing sub-unit included in a lamp lighting device relating to a modified example.

FIG. 19 shows a flowchart for operation of the calculation processing sub-unit 11 in the case of the lamp lighting device relating to the present modified example, which outputs alternating current with the waveform shown in FIG. 18. Processing in Steps S1 and S2 is identical to in the first embodiment, thus explanation thereof is omitted.

The memory of the calculation processing sub-unit 11 stores therein as waveform data, the count value CtA corresponding to length of the A-period (first period), frequencies f11(i) (i=0, 1, . . . , 4), a frequency index i, the frequency f12, the frequency f2 (=1/(2×b)) when the period b corresponds to half a cycle, ratios r(i) (=I2/I1(i)) of the current value I2 to current values I1(i), and information indicating the power P (for example 120 W) selected for supply to the high pressure discharge lamp 4. Each of the frequencies f11(i) (i=0, 1, . . . , 4) is equal to 1/(2×a1 (i)) (i=0, 1, . . . , 4). Initially the frequency index i is set to 0.

After Step S2, the calculation processing sub-unit 11 performs processing to determine the current values I1(i) and I2 so that an average value of power supplied to the high pressure discharge lamp 4 is maintained constant close to the power P selected for power supply (Step S403).

Next, the calculation processing sub-unit 11 notifies the frequency f11(i) (=1/(2×a1(i)) to the frequency control sub-unit 13 (Step S404). The drive circuit 61 causes the switching elements Q1-Q4 of the DC-AC inverter circuit 6 to perform switching operations using the frequency f11(i).

Subsequently, the calculation processing sub-unit 11 notifies the current value I1(i) and the difference value to the PWM control sub-unit 12 (Step S405). The PWM control sub-unit 12 modifies the PWM control signal output therefrom, thereby causing modification of magnitude of the DC voltage output by the voltage step-down circuit 5 so that the current value detected by the current detection unit 8 becomes equal to the current value I1(i).

After the above, the calculation processing sub-unit 11 judges whether the period a1(i) has passed based on the measured value of the counter (Step S406).

If in Step S406 the calculation processing sub-unit 11 judges that the period a1(i) has not passed (Step S406: No), the calculation processing sub-unit 11 repeats processing from Step S405.

On the other hand, if in Step S406 the calculation processing sub-unit 11 judges that the period a1(i) has passed (Step S406: Yes), the calculation processing sub-unit 11 notifies the frequency f12 (=1/(2×a2) to the frequency control sub-unit 13 (Step S407). The drive circuit 61 causes the switching elements Q1-Q4 of the DC-AC inverter circuit 6 to perform switching operations using the frequency f12.

Subsequently, the calculation processing sub-unit 11 notifies the current value MO and the difference value to the PWM control sub-unit 12 (Step S408). The PWM control sub-unit 12 modifies the PWM control signal output therefrom, thereby causing modification of magnitude of the DC voltage output by the voltage step-down circuit 5 so that the current value detected by the current detection unit 8 becomes equal to the current value I1(i).

After the above, the calculation processing sub-unit 11 judges whether the period a2 has passed based on the measured value of the counter (Step S409).

If in Step S409 the calculation processing sub-unit 11 judges that the period a2 has not passed (Step S409: No), the calculation processing sub-unit 11 repeats processing from Step S408.

On the other hand, if in Step S409 the calculation processing sub-unit 11 judges that the period a2 has passed (Step S409: Yes), the calculation processing sub-unit 11 increments the frequency index i stored in the memory by 1 (Step S410).

After the above, the calculation processing sub-unit 11 judges whether the A-period has passed (Step S411).

If in Step S411 the calculation processing sub-unit 11 judges that the A-period has not passed (Step S411: No), the calculation processing sub-unit 11 repeats processing from Step S404.

On the other hand, if in Step S411 the calculation processing sub-unit 11 judges that the A-period has passed (Step S411: Yes), the calculation processing sub-unit 11 notifies the frequency f2 (=1/(2×b)) to the frequency control sub-unit 13 (Step S412).

Subsequently, the calculation processing sub-unit 11 notifies the current value I2 and the difference value to the PWM control sub-unit 12 (Step S413). The PWM control sub-unit 12 modifies the PWM control signal output therefrom, thereby causing modification of magnitude of the DC voltage output by the voltage step-down circuit 5 so that the current value detected by the current detection unit 8 becomes equal to the current value I2.

After the above, the calculation processing sub-unit 11 judges whether the B-period has passed (Step S414).

If in Step S414 the calculation processing sub-unit 11 judges that the B-period has not passed (Step S414: No), the calculation processing sub-unit 11 repeats processing from Step S413.

On the other hand, if in Step S414 the calculation processing sub-unit 11 judges that the B-period has passed (Step S414: Yes), the calculation processing sub-unit 11 sets the frequency index i to 0 (Step S415), and subsequently repeats processing from Step S403.

Processing in Steps S403-S415 described above is repeated until a power source of the lamp lighting device is switched off.

In the present modified example, through appropriate setting of each of the first sub-periods (periods a1(0), a1(1), a1(2), a1(3) and a1(4)) between two second sub-periods (periods a2) in the A-period, the tip 23a, 23b of the electrode 19a, 19b can be maintained in an appropriate shape having a small region for arc spot formation. Thus, through the present modified example occurrence of arc jumping on the surface of the tip 23a, 23b can be further prevented. Furthermore, through the present modified example, depletion of the tip 23a, 23b and the section of the globular portion 22a, 22b joining to the tip 23a, 23b of the electrode 19a, 19b can be restricted, and therefore increase in the electrode separation D can be prevented.

In the present modified example, length of the second sub-period (period a2) is constant, but the present invention is not limited by the above and alternatively each second sub-period (period a2) may differ from one another in terms of length in the same way as each of the first sub-periods.

(4) For the waveform shown in FIG. 18, alternatively the absolute value of the current may be switched in the A-period to a current value I3 that is greater than the current value I1, as shown in FIG. 20. Thus, during part of the A-period (for example period a1(1) in FIG. 20), the absolute value of the current is maintained at the current value I3, which is greater than the current value I1 and smaller than the current value I2.

In order to output alternating current with the waveform shown in FIG. 20, wherein the absolute value of the current during the period a1(1) is set as the current value I3 and the absolute value of the current during periods a1(i) (i=0, 2, 3, 4) is set as the current value I1, the lamp lighting device should preferably be operated as shown in the flowchart in FIG. 19.

Through the present modified example, finer setting of heating of the electrodes 19a, 19b in the A-period is possible, and the tip 23a, 23b of each of the electrodes 19a, 19b can be maintained in a preferable shape, thus further preventing occurrence of arc jumping.

(5) The first embodiment was explained using an example wherein the A-period and the B-period are repeated alternately, but the present invention is not limited by the above. Furthermore, in the first embodiment the absolute value of the current is set as the current value I1 during both the first sub-period (period a1) and the second sub-period (period a2), but the above is not a limitation on the present invention and alternatively the absolute value of the current during the second sub-period may be different to the absolute value of the current during the first sub-period.

Figure 21:
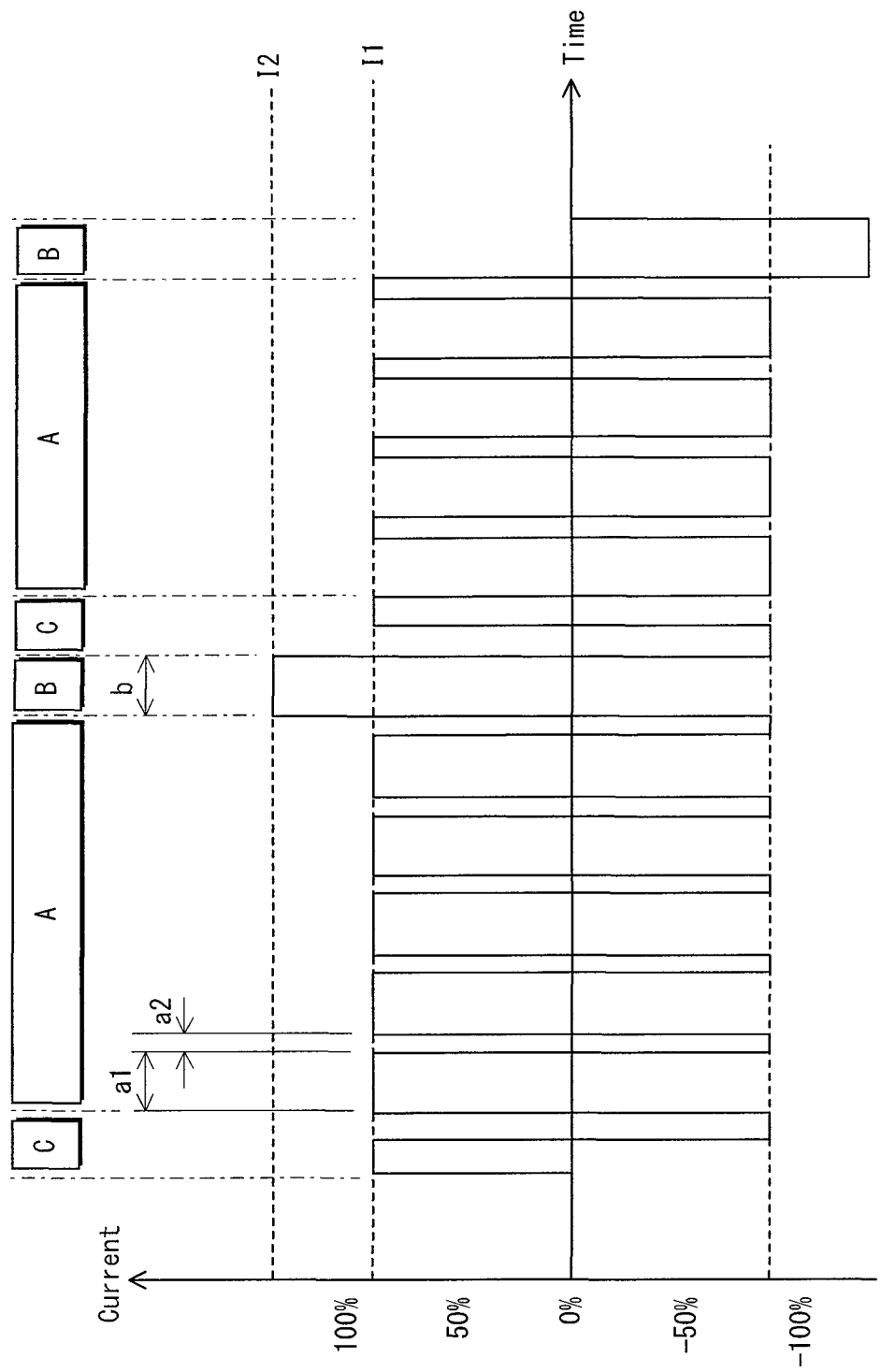
FIG. 21 is a waveform diagram showing alternating current output by a lamp lighting device relating to a modified example.
Figure 22:
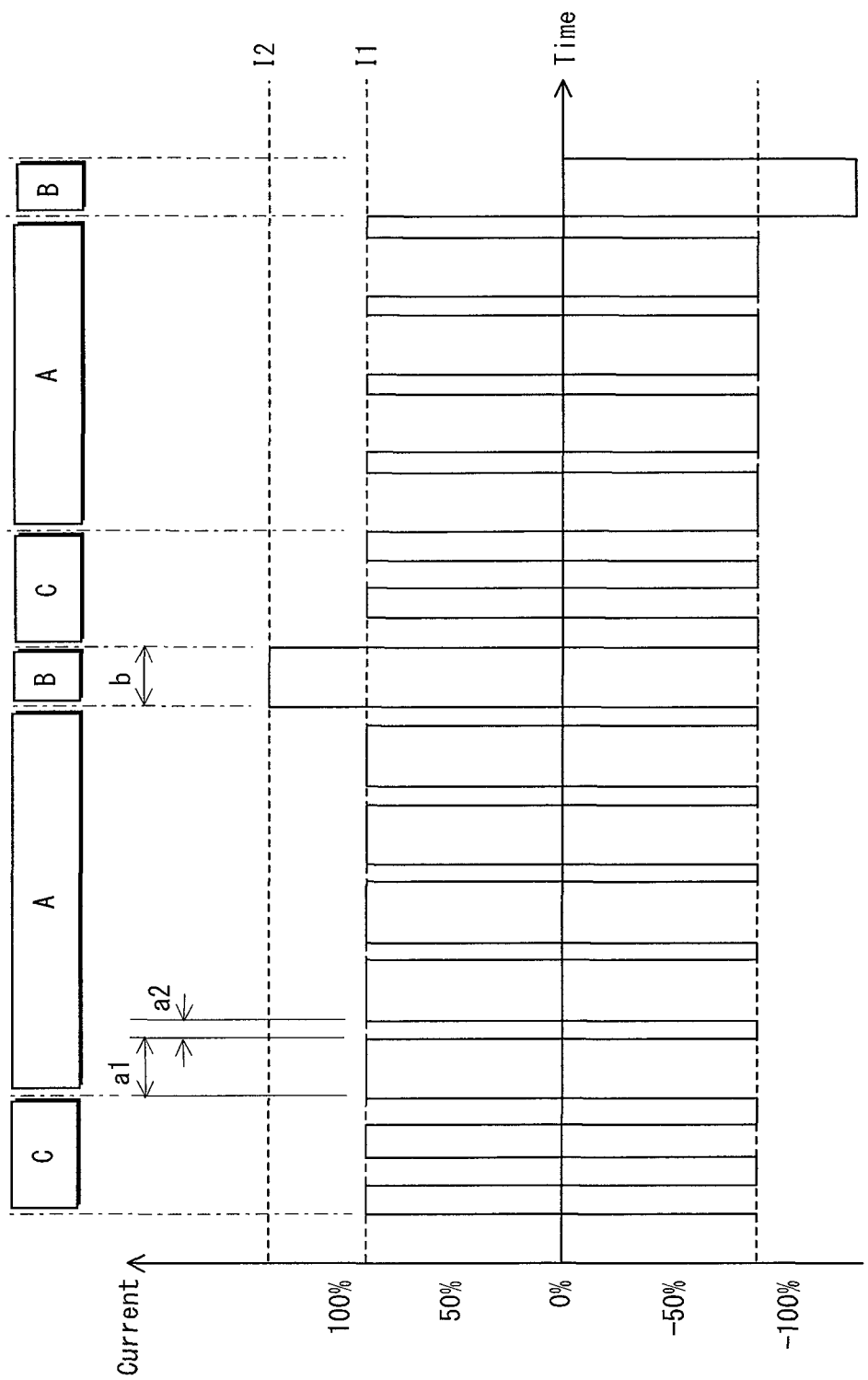
FIG. 22 is a waveform diagram showing alternating current output by a lamp lighting device relating to a modified example.

For example as shown by FIGS. 21 and 22, alternatively a C-period having a current value equal to the A-period and a length as long as or shorter than the B-period may be included between the B-period and the A-period in the waveform shown in FIG. 4. In the C-period a third sub-period and a fourth sub-period of equal length are repeated alternately, the polarity of the current being inverted during the fourth sub-period relative to the polarity of the current during the third sub-period.

In the above configuration, the third sub-period and the fourth sub-period being repeated alternately in the C-period means that the third sub-period and the fourth sub-period are inserted in-between the B-period and the A-period.

In order to output an alternating current with the waveform shown in either FIG. 21 or FIG. 22, the lamp lighting device should preferably be operated in accordance with the operation flowchart described for the modified example in section (3).

In the present modified example, by setting appropriate frequencies of the third sub-period and the fourth sub-period in the C-period occurring between the B-period and the A-period, finer setting of heating of the electrodes 19a, 19b is possible in the same way as described for the modified example shown in FIG. 18. Therefore, through the present modified example the tip 23a, 23b of each of the electrodes 19a, 19b can be maintained in a preferable shape, thus further preventing occurrence of arc jumping.

(6) The first embodiment was explained using an example where the high pressure discharge lamp apparatus 1 is provided with the lamp lighting device 3 which is configured using the DC-AC inverter circuit 6 including a full-bridge circuit. However, the above is not a limitation on the present invention and alternatively the DC-AC inverter circuit 6 may for example include a half-bridge circuit.

(7) The first embodiment was explained using an example which includes the voltage step-down circuit 5, but the present invention is not limited by the above and alternatively a voltage step-up chopper circuit may for example be included instead of the voltage step-down circuit 5.

(8) The first embodiment was explained using an example where the DC voltage power supply device 2 and the lamp lighting device 3 are separate, but the present invention is not limited by the above and alternatively a rectifier circuit in the form of a diode bridge may for example be incorporated into the lamp lighting device 3.

(9) The second embodiment was explained using an example where the three transmissive type liquid crystal panels are used as the image display device, but the present invention is not limited by the above. Alternatively, the projector may use as the image display device, three reflective type liquid crystal panels such as Lcos (Liquid Crystal On Silicon) or a DLP (Digital Light Processing; trademark of Texas Instruments Inc.) which uses three DMSs (Digital Micromirror Devices).

REFERENCE SIGNS LIST 1 high pressure discharge lamp apparatus
2 DC voltage power supply device
3 lamp lighting device
4 high pressure discharge lamp
5 voltage step-down circuit
6 DC-AC inverter circuit
8 current detection unit
9 voltage detection unit
10 control unit
11 calculation processing sub-unit
13 frequency control sub-unit
12 PWM control sub-unit
15 arc tube
16 light-emitting part
17a, 17b sealing part
18 discharge space
19a, 19b electrode
20a, 20b electrode rod
21a, 21b electrode coil
22a, 22b globular portion
23a, 23b tip
24a, 24b metal foil
25a, 25b external lead
26 reflective mirror
27 lamp unit
35 front projector
42 rear projector
61 drive circuit C10 smoothing capacitor
Cp capacitor
D10 diode
L10, Ls inductor
Q1-Q6 switching element
R1, Rs resistance
I1-I3 current value

The invention claimed is:

1. A high pressure discharge lamp lighting device for lighting, by supply of an electric current, a high pressure discharge lamp including a glass bulb with a halogen substance sealed therein and with a pair of electrodes positioned therein in opposing positions to one another, the high pressure discharge lamp lighting device comprising:
   a polarity inverting unit configured to invert polarity of the current to be supplied to the high pressure discharge lamp;
   a current modifying unit configured to modify an absolute value of the current; and
   a control unit configured to control the polarity inverting unit and the current modifying unit, wherein
   the control unit controls the polarity inverting unit to repeat a first period and a second period,
      the first period continuing for at least two cycles, each cycle including a first sub-period during which the current is maintained in one polarity, and a second sub-period during which the current is maintained in an opposite polarity to the one polarity, the second sub-period being shorter than and subsequent to the first sub-period, and
      the second period, during which the current is maintained in a constant polarity, being as long as or longer than the first sub-period, and
   the control unit controls the current modifying unit to maintain the absolute value of the current at a first current value during at least part of the first period, and maintain the absolute value of the current at a second current value, greater than the first current value, during the second period.

2. The high pressure discharge lamp lighting device in claim 1, wherein
   the first sub-period is equal in length to the second period.

3. The high pressure discharge lamp lighting device in claim 2, wherein
   the first sub-period is at least three times as long as the second sub-period.

4. The high pressure discharge lamp lighting device in claim 1, wherein
   the first sub-period is at least three times as long as the second sub-period.

5. The high pressure discharge lamp lighting device in claim 4, wherein
   during part of the first period, the absolute value of the current is maintained at a third current value, greater than the first current value and smaller than the second current value.

6. The high pressure discharge lamp lighting device in claim 1, wherein
   during part of the first period, the absolute value of the current is maintained at a third current value, greater than the first current value and smaller than the second current value.

7. The high pressure discharge lamp lighting device in claim 6, wherein
   the first sub-period differs in length in each cycle of the first period, and
   the second sub-period differs in length in each cycle of the first period.

8. The high pressure discharge lamp lighting device in claim 1, wherein
   the first sub-period differs in length in each cycle of the first period, and
   the second sub-period differs in length in each cycle of the first period.

9. The high pressure discharge lamp lighting device in claim 1, wherein
   the control unit controls the current modifying unit to maintain the absolute value of the current at the first current value during a third period that is subsequent to and as long as or longer than the second period, and
   the control unit controls the polarity inverting unit to repeat a third sub-period and a fourth sub-period during the third period, the third sub-period, during which the current is maintained in one polarity, being as long as or shorter than the second period, and the fourth sub-period, during which the current is maintained in an opposite polarity to the one polarity, being subsequent and equal in length to the third sub-period.

10. A projector provided with the high pressure discharge lamp lighting device in claim 9.

11. A projector provided with the high pressure discharge lamp lighting device in claim 1.

12. A high pressure discharge lamp lighting method for lighting, by supply of an electric current, a high pressure discharge lamp including a glass bulb with a halogen substance sealed therein and with a pair of electrodes positioned therein in opposing positions to one another, the high pressure discharge lamp lighting method comprising:
   repeating a first period and a second period, wherein
      the first period continues for at least two cycles, each cycle including a first sub-period during which the current is maintained in one polarity, and a second sub-period during which the current is maintained in an opposite polarity to the one polarity, the second sub-period being shorter than and subsequent to the first sub-period, and
      the second period, during which the current is maintained in a constant polarity, is as long as or longer than the first sub-period, and
   maintaining the absolute value of the current at a first current value during at least part of the first period and at a second current value, greater than the first current value, during the second period.

* * * * *